US010070363B2

(12) United States Patent
Kashiwase

(10) Patent No.: US 10,070,363 B2
(45) Date of Patent: Sep. 4, 2018

(54) MOBILE COMMUNICATION SYSTEM HAVING RADIO TERMINAL(S) THAT COMMUNICATE DIRECTLY WITH OTHER RADIO TERMINAL(S)

(71) Applicant: KYOCERA CORPORATION, Kyoto (JP)

(72) Inventor: Susumu Kashiwase, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/431,695

(22) PCT Filed: Sep. 25, 2013

(86) PCT No.: PCT/JP2013/075908
§ 371 (c)(1),
(2) Date: Mar. 26, 2015

(87) PCT Pub. No.: WO2014/050886
PCT Pub. Date: Apr. 3, 2014

(65) Prior Publication Data
US 2015/0237555 A1 Aug. 20, 2015

Related U.S. Application Data

(60) Provisional application No. 61/706,251, filed on Sep. 27, 2012, provisional application No. 61/706,262, (Continued)

(51) Int. Cl.
*H04W 36/30* (2009.01)
*H04W 76/04* (2009.01)
(Continued)

(52) U.S. Cl.
CPC ......... *H04W 36/30* (2013.01); *H04W 76/043* (2013.01); *H04W 76/23* (2018.02); *H04W 88/06* (2013.01)

(58) Field of Classification Search
CPC ........ H04B 7/15; H04W 88/04; H04W 16/14; H04W 72/0406; H04W 36/0011;
(Continued)

(56) References Cited

U.S. PATENT DOCUMENTS 8,331,280 B2 * 12/2012 Hottinen ................ H04B 7/155
370/315
2004/0033778 A1 * 2/2004 Fonseca, Jr. ......... H04B 7/2606
455/11.1
(Continued)

FOREIGN PATENT DOCUMENTS

JP   H11-163774 A    6/1999
JP   2005-341300 A   12/2005
(Continued)

OTHER PUBLICATIONS

International Search Report; PCT/JP2013/075908; dated Nov. 12, 2013.
(Continued)

Primary Examiner — Edan Orgad
Assistant Examiner — Ivan O Latorre
(74) Attorney, Agent, or Firm — Studebaker & Brackett PC

(57) ABSTRACT

A mobile communication system comprises: a switching control unit that controls switching of communication to be performed by the second radio terminal between the first communication and the second communication, on the basis of received quality of a downlink signal received in the second radio terminal from the radio base station when the first radio terminal performs the first communication. The first radio terminal relays user data, which is transferred through the second communication, between the second radio terminal and the radio base station when the first radio
(Continued)

terminal performs the first communication and the second radio terminal performs the second communication.

5 Claims, 18 Drawing Sheets

Related U.S. Application Data filed on Sep. 27, 2012, provisional application No. 61/706,289, filed on Sep. 27, 2012.

(51) Int. Cl.
*H04W 76/23* (2018.01)
*H04W 88/06* (2009.01)

(58) Field of Classification Search
CPC ... H04W 36/30; H04W 76/043; H04W 88/06; H04W 76/02; H04W 92/18; H04W 76/023
USPC ....... 370/216, 241, 279, 315, 328, 329, 331; 455/7, 11.1, 414.1, 518
See application file for complete search history.

(56) References Cited

U.S. PATENT DOCUMENTS

| | | | |
|---|---|---|---|
| 2007/0123245 A1 | 5/2007 | Hu | |
| 2007/0153747 A1* | 7/2007 | Pan | H04W 36/14 370/338 |
| 2007/0197161 A1* | 8/2007 | Walke | H04B 7/15507 455/7 |
| 2009/0253417 A1 | 10/2009 | Soma et al. | |
| 2009/0325622 A1* | 12/2009 | Matsumura | H04B 7/2606 455/522 |
| 2010/0046486 A1* | 2/2010 | Maruyama | G06F 21/36 370/338 |
| 2010/0167743 A1* | 7/2010 | Palanki | H04B 7/155 455/436 |
| 2010/0240312 A1* | 9/2010 | Peng | H04W 72/02 455/63.1 |
| 2010/0303038 A1* | 12/2010 | Krohn | H04W 24/02 370/330 |
| 2011/0019606 A1* | 1/2011 | Umeda | H04W 24/02 370/315 |
| 2011/0038284 A1* | 2/2011 | Senarath | H04B 7/155 370/279 |
| 2011/0170431 A1* | 7/2011 | Palanki | H04W 52/245 370/252 |
| 2011/0228666 A1* | 9/2011 | Barbieri | H04W 76/023 370/216 |
| 2011/0268101 A1* | 11/2011 | Wang | H04L 5/0053 370/344 |
| 2012/0040607 A1* | 2/2012 | Yang | H04W 40/22 455/9 |
| 2012/0044815 A1* | 2/2012 | Geirhofer | H04W 8/005 370/248 |
| 2012/0093098 A1* | 4/2012 | Charbit | H04W 72/04 370/329 |
| 2012/0127888 A1* | 5/2012 | Fujishima | H04W 72/085 370/252 |
| 2013/0188552 A1* | 7/2013 | Kazmi | H04L 5/001 370/315 |
| 2013/0250798 A1 | 9/2013 | Iwamura et al. | |
| 2013/0252621 A1* | 9/2013 | Dimou | H04W 72/082 455/450 |
| 2013/0322388 A1* | 12/2013 | Ahn | H04W 76/023 370/329 |
| 2013/0343350 A1* | 12/2013 | Weinrib | H04B 7/2643 370/336 |
| 2014/0023008 A1 | 1/2014 | Ann et al. | |
| 2014/0086141 A1* | 3/2014 | Morioka | H04W 40/08 370/315 |
| 2014/0105011 A1* | 4/2014 | Chandramouli | H04W 4/08 370/230 |
| 2014/0256334 A1* | 9/2014 | Kazmi | H04W 28/18 455/450 |
| 2015/0172896 A1* | 6/2015 | Van Phan | H04W 4/22 455/404.1 |
| 2015/0208452 A1* | 7/2015 | Lee | H04W 36/0061 455/426.1 |

FOREIGN PATENT DOCUMENTS

| | | |
|---|---|---|
| JP | 2007-151006 A | 6/2007 |
| JP | 2009-159409 A | 7/2009 |
| JP | 2009-253752 A | 10/2009 |
| JP | 2012-004659 A | 1/2012 |
| JP | 2012-60373 A | 3/2012 |
| JP | 2013-523018 | 6/2013 |
| WO | 2010/049801 A1 | 5/2010 |
| WO | 2011/116017 A1 | 9/2011 |
| WO | 2012/049351 A1 | 4/2012 |
| WO | 2012/073846 A1 | 6/2012 |
| WO | 2012/091420 A2 | 7/2012 |
| WO | WO 2012/091418 * 7/2012 ............ H04W 76/02 |

OTHER PUBLICATIONS

3GPP TR 22.803 V0.3.0 (May 2012); 3rd Generation Partnership Project; Technical Specification Group SA; Feasiblity Study for Proximity Services (ProSe) (Release 12); pp. 1-24.
3GPP TR 22.803 V0.5.0 (Aug. 2012); 3rd Generation Partnership Project; Technical Specification Group SA; Feasibility Study for Proximity Services (ProSe) (Release12); pp. 1-6.
The extended European search report issued by the European Patent Office dated Jun. 6, 2016, which corresponds to European Patent Application No. 13840727.5-1862 and is related to U.S. Appl. No. 14/431,695.
An Office Action issued by the Japanese Patent Office dated Oct. 6, 2015, which corresponds to Japanese Patent Application No. 2014-538528 and is related to U.S. Appl. No. 14/431,695; with concise statement of relevance.
An Office Action issued by the Japanese Patent Office dated Jul. 11, 2017, which corresponds to Japanese Patent Application No. 2017-077300 and is related to U.S. Appl. No. 14/431,695; with English language concise explanation.
JP Office Action dated Dec. 12, 2017 from corresponding JP Appl No. 2017-077300, with English statement of relevance, 3 pp.
Klaus Doppler et al., "Device-to-Device Communication as an Underlay to LTE-Advanced Networks", IEEE Communications Magazine, Dec. 2009, pp. 42-49.

* cited by examiner

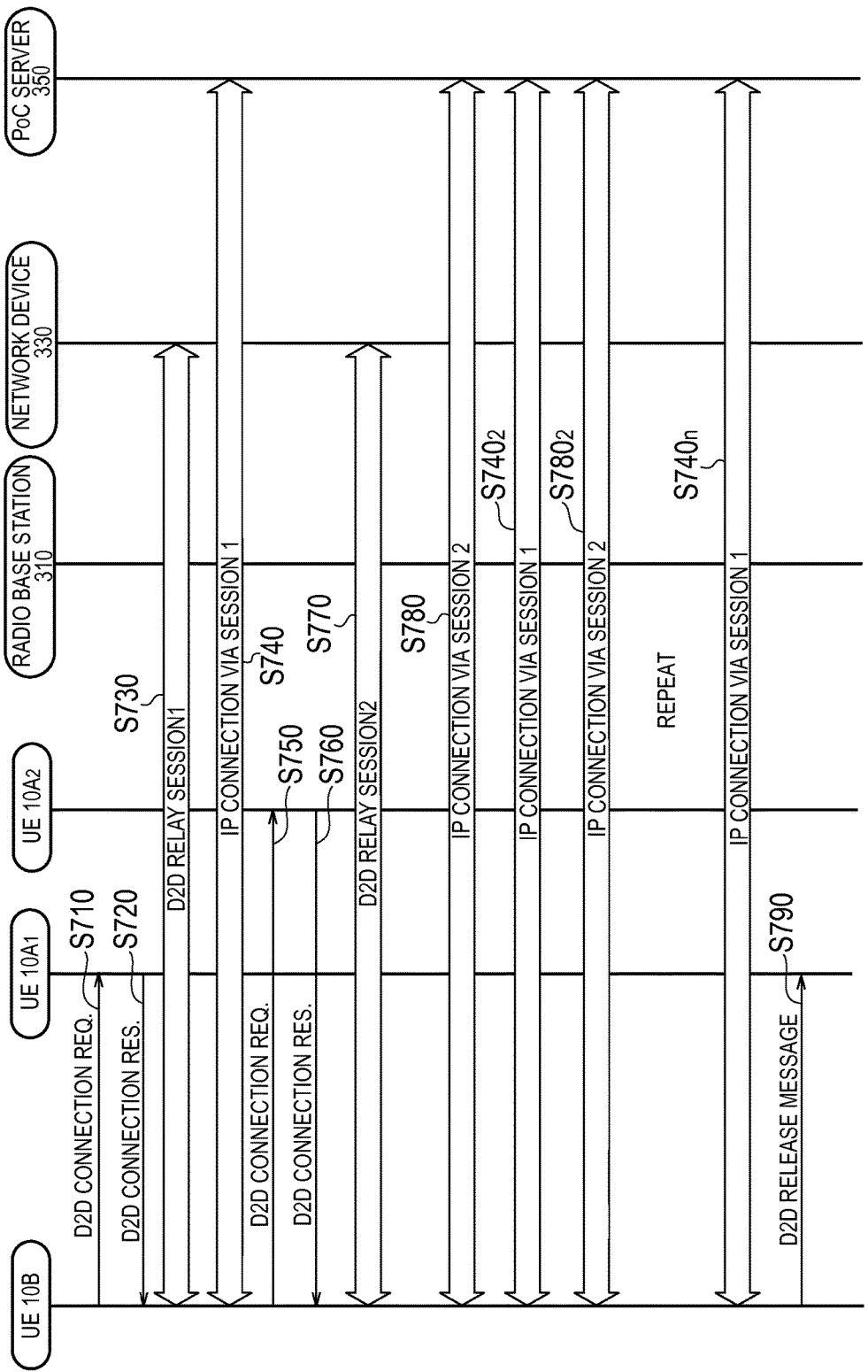

MOBILE COMMUNICATION SYSTEM HAVING RADIO TERMINAL(S) THAT COMMUNICATE DIRECTLY WITH OTHER RADIO TERMINAL(S)

TECHNICAL FIELD

The present invention relates to a mobile communication system that directly performs communication of user data among a plurality of radio terminals, and a mobile communication method used in the mobile communication system.

BACKGROUND ART

In recent years, there has been proposed a technology for directly performing communication of user data (data of a User-Plane) among a plurality of radio terminals without going through a radio base station. This technology is also called D2D (Device to Device) communication. The user data is communicated directly among the plurality of radio terminals by using a part of radio resources assigned to a mobile communication system. However, in the D2D communication, data of control data (C-Plane) is communicated via the radio base station, similarly to a conventional mobile communication system.

PRIOR ART DOCUMENT

Non-Patent Document

Non Patent Document 1: 3GPP technical report "TR 22.803 V0.3.0" May 2012

SUMMARY OF THE INVENTION

Meanwhile, as a use scene of the D2D communication, various use scenes are considered. In other words, it is necessary to discuss a use scene in which the D2D communication is effectively used.

A mobile communication system according to a present application includes a first radio terminal, a second radio terminal, and a radio base station. The first radio terminal comprises: a first control unit that has a function of performing first communication of user data that is performed via the radio base station, and a function of performing second communication of user data that is directly performed between the first radio terminal and the second radio terminal without going through the radio base station. The second radio terminal comprises: a second control unit that has a function of performing first communication of user data that is performed via the radio base station, and a function of performing second communication of user data that is directly performed between the first radio terminal and the second radio terminal without going through the radio base station. The mobile communication system comprises: a switching control unit that controls switching of communication to be performed by the second radio terminal between the first communication and the second communication, on the basis of received quality of a downlink signal received in the second radio terminal from the radio base station when the first radio terminal performs the first communication. The first control unit relays user data, which is transferred through the second communication, between the second radio terminal and the radio base station when the first radio terminal performs the first communication and the second radio terminal performs the second communication.

BRIEF DESCRIPTION OF THE DRAWINGS

FIG. 19 is a diagram illustrating the mobile communication method according to the third embodiment.

DESCRIPTION OF THE EMBODIMENT

Figure 1:
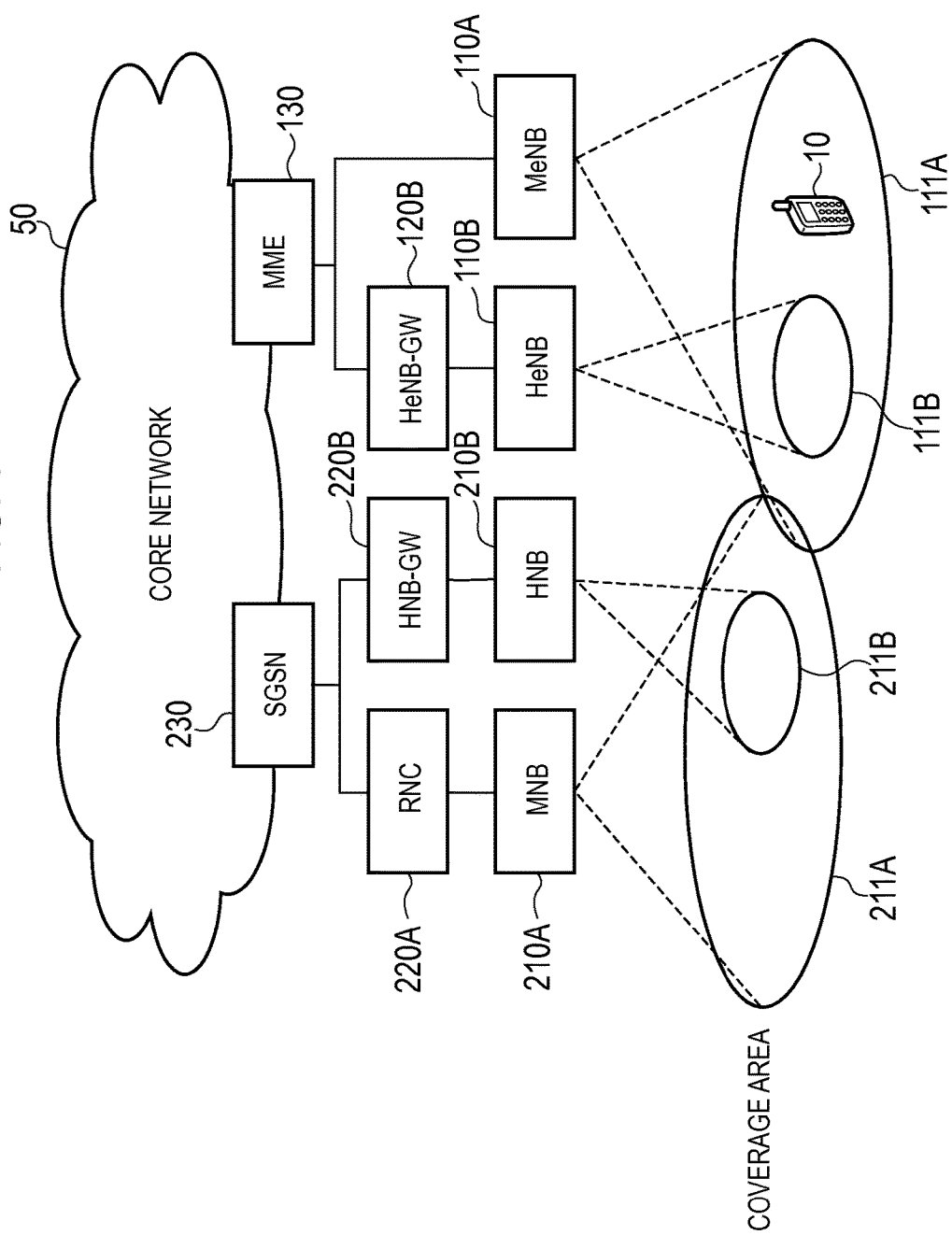
FIG. 1 is a diagram illustrating a mobile communication system 100 according to a first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

Overview of Embodiment

The mobile communication system according to the first embodiment includes a first radio terminal, a second radio terminal, and a radio base station. The first radio terminal includes a first control unit that has a function of performing first communication of user data that is performed via the radio base station, and a function of performing second communication of user data that is directly performed between the first radio terminal and the second radio terminal without going through the radio base station. The second radio terminal includes a second control unit that has a function of performing first communication of user data that is performed via the radio base station, and a function of performing second communication of user data that is directly performed between the first radio terminal and the second radio terminal without going through the radio base station. The mobile communication system includes a switching control unit that controls the switching of communication to be performed by the second radio terminal between the first communication and the second communication, on the basis of the received quality of a downlink signal received in the second radio terminal from the radio base station when the first radio terminal performs the first communication. The first control unit relays user data, which is transferred through the second communication, between the second radio terminal and the radio base station when the first radio terminal performs the first communication and the second radio terminal performs the second communication.

In the first embodiment, the first radio terminal relays user data, which is transferred through the second communication (D2D communication), between the second radio terminal and the radio base station. In this way, even in the state in which the second radio terminal is not able to perform the first communication (cellular communication) (for example, the state in which the second radio terminal enters a tunnel), it is possible to continue the communication of the second radio terminal.

In the first embodiment, the switching control unit controls the switching of communication to be performed by the second radio terminal between the first communication and the second communication, on the basis of the received quality of a downlink signal received in the second radio terminal from the radio base station when the first radio terminal performs the first communication. In this way, in the state in which the second radio terminal is not able to perform the first communication (the cellular communication), the second radio terminal performs the second communication (the D2D communication), so that it is possible to continue the communication of the second radio terminal. Furthermore, in the state in which the second radio terminal is able to perform the first communication (the cellular communication), the second radio terminal performs the first communication (the cellular communication), it is possible to reduce a load of the first radio terminal.

As described above, according to the first embodiment, it is possible to newly create a use scene in which the D2D communication is effectively used.

Furthermore, in the first embodiment, the first control unit notifies the second radio terminal of information for identifying the downlink signal transmitted from the radio base station when the second radio terminal does not perform the first communication and performs the second communication.

Furthermore, in the first embodiment, the switching control unit switches the communication to be performed by the second radio terminal to the second communication when the received quality of the downlink signal received in the second radio terminal from the radio base station becomes less than a first threshold value.

Furthermore, in the first embodiment, the switching control unit switches the communication to be performed by the second radio terminal to the second communication when the received quality of the downlink signal received in the second radio terminal from the radio base station becomes less than a first threshold value beyond a first period.

Furthermore, in the first embodiment, the switching control unit switches the communication to be performed by the second radio terminal to the first communication when the received quality of the downlink signal received in the second radio terminal from the radio base station exceeds a second threshold value.

Furthermore, in the first embodiment, the switching control unit switches the communication to be performed by the second radio terminal to the first communication when the received quality of the downlink signal received in the second radio terminal from the radio base station exceeds a second threshold value beyond a second period.

Furthermore, in the first embodiment, the switching control unit is provided in the second control unit.

Furthermore, in a modification according to the first embodiment, the second control unit notifies a network device of the received quality of the downlink signal received in the second radio terminal from the radio base station, and the switching control unit is provided in the network device.

A mobile communication system according to the second embodiment includes a plurality of first radio terminals, a second radio terminal, and a radio base station. Each of the plurality of first radio terminals comprises: a first control unit that has a function of performing first communication of user data that is performed via the radio base station, and a function of performing second communication of user data that is directly performed between the first radio terminal and the second radio terminal without going through the radio base station. The second radio terminal comprises: a second control unit that has a function of performing first communication of user data that is performed via the radio base station, and a function of performing second communication of user data that is directly performed between the first radio terminal and the second radio terminal without going through the radio base station. The mobile communication system comprises: a selection unit that selects a first radio terminal, with which the second radio terminal is to perform the second communication, from among the plurality of first radio terminals on the basis of received quality of a signal received in the second radio terminal from each of the plurality of first radio terminals. The first control unit relays user data, which is transferred through the second communication, between the second radio terminal and the radio base station when the first radio terminal performs the first communication and the second radio terminal performs the second communication.

In the second embodiment, the first radio terminal relays user data, which is transferred through the second communication (D2D communication), between the second radio terminal and the radio base station. In this way, even in the state in which the second radio terminal is not able to perform the first communication (cellular communication) (for example, the state in which the second radio terminal enters a tunnel), it is possible to continue the communication of the second radio terminal.

In the second embodiment, the selection unit selects a first radio terminal, with which the second radio terminal should perform the second communication, from among the plurality of first radio terminals on the basis of the received quality of a signal received in the second radio terminal from each of the plurality of first radio terminals. In this way, it is possible to appropriately select a first radio terminal that should relay user data that is transferred through the second communication (the D2D communication).

Furthermore, in the second embodiment, the selection unit is provided in the second control unit.

Furthermore, in a modification according to the second embodiment, the second control unit notifies a network node of the received quality of the signal received in the second radio terminal from each of the plurality of first radio terminals, and the selection unit is provided in the network node.

A mobile communication system according to the third embodiment includes a plurality of first radio terminals, a second radio terminal, and a radio base station. Each of the plurality of first radio terminals includes a first control unit that has a function of performing first communication of user data that is performed via the radio base station, and a function of performing second communication of user data that is directly performed between the first radio terminal and the second radio terminal without going through the radio base station. The second radio terminal includes a second control unit that has a function of performing first communication of user data that is performed via the radio base station, and a function of performing second communication of user data that is directly performed between the first radio terminal and the second radio terminal without going through the radio base station. The second control unit time-divisionally switches the first radio terminal, which is to perform the second communication, when a communication path for performing the second communication has been set between each of the plurality of first radio terminals and the second radio terminal. The first control unit relays user data, which is transferred through the second communication, between the second radio terminal and the radio base station when the first radio terminal performs the first communication and the second radio terminal performs the second communication.

In the third embodiment, the first radio terminal relays user data, which is transferred through the second communication (D2D communication), between the second radio terminal and the radio base station. In this way, even in the state in which the second radio terminal is not able to perform the first communication (cellular communication) (for example, the state in which the second radio terminal enters a tunnel), it is possible to continue the communication of the second radio terminal.

In the third embodiment, the second control unit time-divisionally switches the first radio terminal, which is to perform the second communication, when a communication path for performing the second communication has been set between each of a plurality of the first radio terminals and the second radio terminal. In this way, it is possible to distribute loads of the first radio terminals without concentrating a load on one first radio terminal.

Furthermore, in the third embodiment, when the number of times, by which the first radio terminal is selected to perform the second communication, has reached a predetermined number of times, the second control unit releases a communication path that is set for the first radio terminal having the number of selecting times which has reached the predetermined number of times.

Furthermore, in the third embodiment, when a passage time after setting of a communication path for performing the second communication has reached a predetermined time, the second control unit releases a communication path that is set for the first radio terminal having the passage time which has reached the predetermined time.

Furthermore, in the third embodiment, an upper limit of the number of first radio terminals that relay the user data transferred through the second communication, between the second radio terminal and the radio base station, is determined in advance.

Furthermore, in the third embodiment, a time interval, in which an operation for setting a communication path for performing the second communication with a new first radio terminal is permitted, is determined in advance.

Furthermore, the communication performed directly among the plurality of radio terminals without passing through the radio base station may be called D2D communication. The D2D communication is performed by using a part (a D2D radio resource) of the radio resources assigned to the mobile communication system. As the D2D radio resource, for example, a part of uplink radio resources is used.

In the embodiment, a radio resource to be used for the communication of user data in the D2D communication may be assigned by a radio base station in a connected state, which establishes a radio connection (an RRC connection) with a plurality of radio terminals. Alternatively, the radio resource to be used for the communication of the user data in the D2D communication may also be assigned by one of the plurality of radio terminals.

First Embodiment (Mobile Communication System)

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system is a communication system corresponding to LTE (Long Term Evolution), for example. The first communication system has a base station 110A (hereinafter, referred to as MeNB 110A), a home base station 110B (hereinafter, referred to as HeNB 110B), a home base station gateway 120B (hereinafter, referred to as HeNB-GW 120B), and MME 130, for example.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system is a communication system corresponding to UMTS (Universal Mobile Telecommunication System), for example. The second communication system includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) configured to perform radio communication with the UE 10 being present in the general cell 111A.

The HeNB 110B, which manages a specific cell 111B, is a device (Home evolved NodeB) configured to perform radio communication with the UE 10 being present in the specific cell 111B.

The HeNB-GW 120B, which is connected to the HeNB 110B, is a device (Home evolved NodeB Gateway) configured to manage the HeNB 110B.

The MME 130, which is connected to the MeNB 110A, is a device (Mobility Management Entity) configured to manage the mobility of the UE 10 having set up a radio connection with the MeNB 110A. Furthermore, the MME 130, which is connected to the HeNB 110B via the HeNB-GW 120B, is a device configured to manage the mobility of the UE 10 having set up a radio connection with the HeNB 110B.

The MNB 210A, which manages a general cell 211A, is a device (NodeB) configured to perform radio communication with the UE 10 being present in the general cell 211A.

The HNB 210B, which manages a specific cell 211B, is a device (Home NodeB) configured to perform radio communication with the UE 10 being present in the specific cell 211B.

The RNC 220A, which is connected to the MNB 210A, is a device (Radio Network Controller) configured to set up a radio connection (RRC Connection) with the UE 10 being present in the general cell 211A.

The HNB-GW 220B, which is connected to the HNB 210B, is a device (Home NodeB Gateway) configured to set up a radio connection (RRC Connection) with the UE 10 being present in the specific cell 211B.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

In addition, the general cell and the specific cell should be understood as a function of performing radio communication with the UE 10. However, the general cell and the specific cell are also used as a term indicating a coverage area of a cell. Furthermore, cells such as general cells and specific cells are identified by frequencies, spreading codes, time slots and the like used in the cells.

Here, a coverage area of the general cell is wider than a coverage area of the specific cell. The general cell, for example, is a macro cell provided by a communication provider. The specific cell, for example, is a femto cell or a home cell provided by a third party other than the communication provider. The specific cell may be a CSG (Closed Subscriber Group) cell or a pico cell provided by the communication provider.

Hereinafter, the first communication system will be mainly described. The following description may also be applied to the second communication system.

In the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, as an uplink channel, an uplink control channel (PUCCH; Physical Uplink Control Channel), an uplink shared channel (PUSCH; Physical Uplink Shared Channel) and the like exist. Furthermore, as a downlink channel, a downlink control channel (PDSCH; Physical Downlink Control Channel), a downlink shared channel (PDSCH; Physical Downlink Shared Channel) and the like exist.

The uplink control channel is a channel that carries a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying of a recommended modulation scheme and a coding rate to be used in the downlink transmission. The PMI is a signal that indicates a precoding matrix that is desirably used for the downlink transmission. The RI is a signal that indicates the number of layers (the number of streams) to be used in the downlink transmission. The SR is a signal that requests the assignment of an uplink radio resource (a resource block which will be described later). The ACK/NACK is a signal that indicates whether a signal that is transmitted through a downlink channel (for example, PDSCH) has been able to be received.

The uplink shared channel is a channel that carries a control signal (including the aforementioned control signal) and/or a data signal. For example, the uplink radio resource may be assigned only to the data signal, or may be assigned such that the data signal and the control signal are multiplexed.

The downlink control channel is a channel that carries a control signal. The control signal, for example, includes Uplink SI (Scheduling Information), Downlink SI (Scheduling Information), and a TPC bit.

The Uplink SI is a signal that indicates the assignment of the uplink radio resource. The Downlink SI is a signal that indicates the assignment of a downlink radio resource. The TPC bit is a signal that indicates increase and decrease in power of a signal that is transmitted through the uplink channel.

The downlink shared channel is a channel that carries a control signal and/or a data signal. For example, the downlink radio resource may be assigned only to the data signal, or may be assigned such that the data signal and the control signal are multiplexed.

In addition, a control signal transmitted through the downlink shared channel includes TA (Timing Advance). The TA is information for correcting the timing of transmission between the UE 10 and the MeNB 110A, and is measured by the MeNB 110A on the basis of an uplink signal transmitted from the UE 10.

Furthermore, a control signal that is transmitted through a channel other than the downlink control channel (PDCCH) and the downlink shared channel (PDSCH) includes the ACK/NACK. The ACK/NACK is a signal that indicates whether a signal transmitted through an uplink channel (for example, PUSCH) has been able to be received.

In addition, the general cell and the specific cell broadcast broadcast information through a broadcast channel (BCCH; Broadcast Control Channel). The broadcast information, for example, is information such as MIB (Master Information Block) and SIB (System Information Block).

Specifically not illustrated in FIG. 1, the first communication system may include a relay node configured to relay data communication between the MeNB 110A (or the HeNB 110B) and the UE 10. Similarly, the second communication system may include a relay node configured to relay data communication with the MNB 210A (or the HNB 210B).

(Radio Frame)

Figure 2:
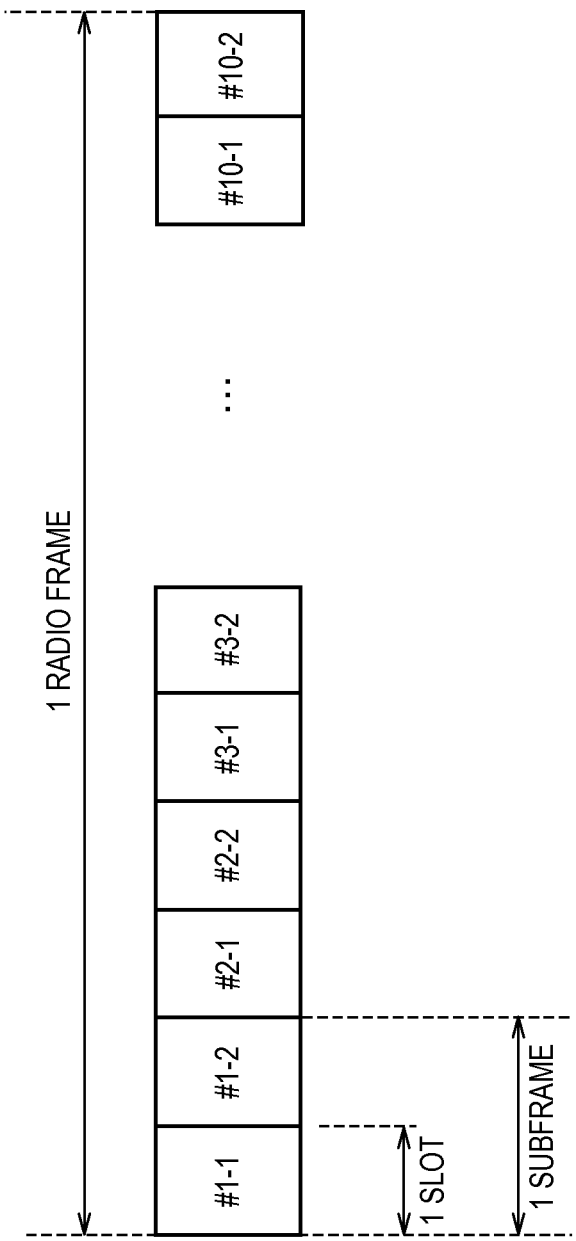
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in a downlink. Similarly, one slot is configured by a plurality of SC-FDMA symbols (for example, six SC-FDMA symbols or seven SC-FDMA symbols) in an uplink.

(Radio Resource)

Figure 3:
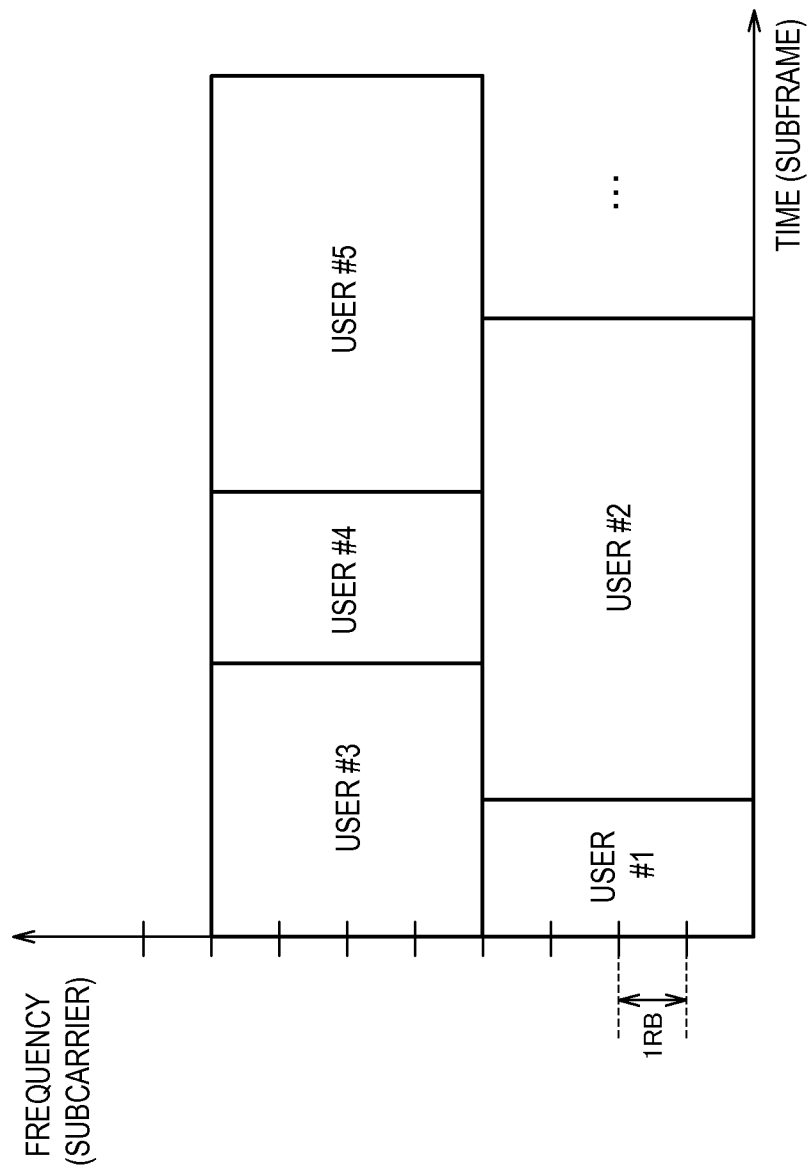
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively calleda resource block (RB). A time has a unit, such as the OFDM symbol (or the SC-FDMA symbol), the slot, the subframe, and the radio frame, as described above.

Here, the radio resource is assignable to each one resource block. Furthermore, on the frequency axis and the time axis, it is possible to divide and assign the radio resources to a plurality of users (for example, a user #1 to a user #5).

Furthermore, the radio resource is assigned by the MeNB 110A. The MeNB 110A assigns the radio resources to each UE 10 on the basis of the CQI, the PMI, the RI and the like.

(Application Case)

Figure 4:
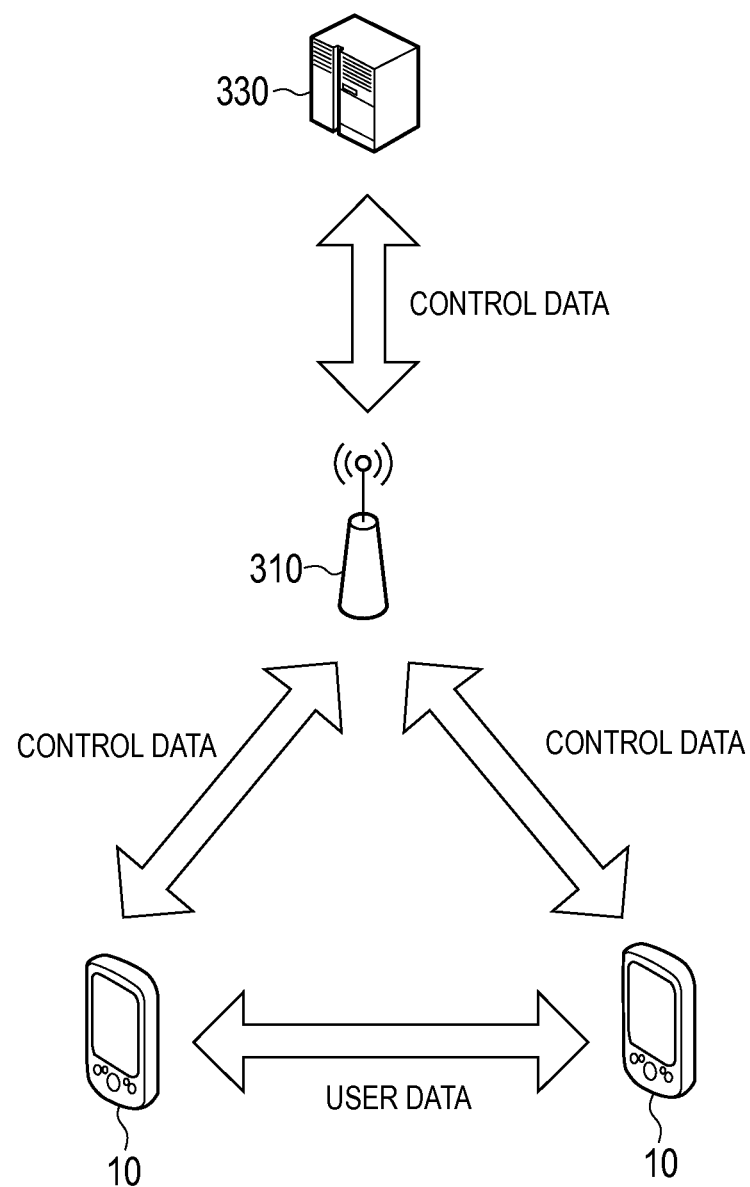
FIG. 4 is a diagram illustrating a case where the first embodiment is applied.

Hereinafter, the application case according to the first embodiment will be described. FIG. 4 is a diagram for explaining the application case according to the first embodiment. In FIG. 4, it is preferable that a radio base station 310 is the MeNB 110A or the HeNB 110B. However, the radio base station 310 may be the MNB 210A or the HNB 210B. Alternatively, the radio base station 310 may be a relay node. A network device 330 is a device provided in the core network 50. The network device 330 may be the MME 130 or the SGSN 230.

As illustrated in FIG. 4, the user data (User-Plane data) is communicated directly among a plurality of UEs 10 without passing through the radio base station (hereinafter, referred to as D2D communication). On the other hand, data of control data (C-Plane data) is communicated via the radio base station 310, similarly to a conventional mobile communication system.

Furthermore, the D2D communication is performed by using a part (hereinafter, a D2D radio resource) of radio resources assigned to the mobile communication system. As the D2D radio resource, for example, apart of uplink radio resources is used. A radio resource to be used for the communication of user data in the D2D communication may be assigned by a radio base station (the radio base station 310) in a connected state, which establishes a radio connection with a plurality of UEs 10. In such a case, it is preferable that the D2D radio resource, for example, is broadcasted from each cell managed by the radio base station. The D2D radio resource, for example, may be included in MIB (Master Information Block) or SIB (System Information Block). Alternatively, the radio resource to be used for the communication of the user data in the D2D communication may also be assigned by one of the plurality of UEs 10.

Figure 5:
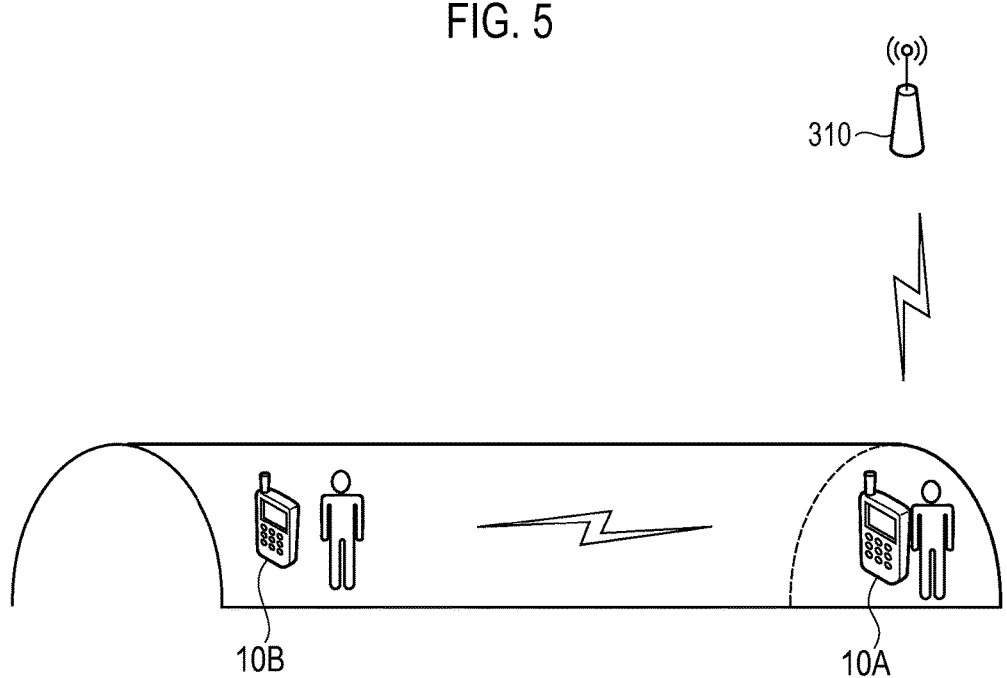
FIG. 5 is a diagram illustrating a case where the first embodiment is applied.

In the first embodiment, a description will be provided for the state in which the second radio terminal is not able to perform the first communication (the cellular communication) (for example, the state in which the second radio terminal enters a tunnel) as illustrated in FIG. 5. Furthermore, FIG. 5 illustrates a plurality of first UEs 10A and a second UE 10B as the plurality of UEs 10.

The first UEs 10A has a function of performing the first communication (the cellular communication) of user data that is performed via the radio base station 310, and a function of performing the second communication (the D2D communication) of user data that is directly performed between the first UE 10A and the second UE 10B without going through the radio base station 310. In the same manner, the second UE 10B has a function of performing the first communication (the cellular communication) of user data that is performed via the radio base station 310, and a function of performing the second communication (the D2D communication) of user data that is directly performed between the first UE 10A and the second UE 10B without going through the radio base station 310.

The case, in which under the above conditions, the first UE 10A performs the cellular communication and the D2D communication is performed between the first UE 10A and the second UE 10B, is considered. The first UE 10A relays user data, which is transferred through the D2D communication, between the second UE 10B and the radio base station 310. In addition, the first UE 10A may relay control data, which is transferred through the D2D communication, between the second UE 10B and the radio base station 310.

In the first embodiment, as communication to be performed by the second UE 10B, it is possible to employ the cellular communication between the second UE 10B and the radio base station 310 or the D2D communication between the first UE 10A and the second UE 10B. The communication to be performed by the second UE 10B is switched on the basis of the received quality of a downlink signal received in the second UE 10B from the radio base station 310.

Furthermore, when the second UE 10B performs the D2D communication, that is, when the second UE 10B does not perform the cellular communication, it is preferable that the first UE 10A notifies the second UE 10B of information for identifying the downlink signal transmitted from the radio base station 310.

The downlink signal, for example, is one of (a) a reference signal that is unique to a cell managed by the radio base station 310 and is broadcasted from the radio base station 310, (b) broadcast information such as MIB or SIB broadcasted from the radio base station 310 or a signal (PSS; Primary Synchronization Signal or SSS; Secondary Synchronization Signal) transmitted from the radio base station 310 via a synchronization channel, and (c) a signal transmitted from the radio base station 310 via a downlink control channel (PDCCH) or a downlink shared channel (PDSCH).

The received quality of the downlink signal may be received quality when the second UE 10B is in a connected state, or received quality when the second UE 10B is in an idle state. The received quality of the downlink signal may be the received power of the downlink signal or the communication speed of the downlink signal. Alternatively, the received quality of the downlink signal may be SIR (Signal-to-Interference Ratio) of the downlink signal or an error rate (BLER; Block Error Rate) of the downlink signal.

In the first embodiment, when the received quality of the downlink signal received in the second UE 10B from the radio base station 310 becomes less than a first threshold value, the communication to be performed by the second UE 10B is switched to the D2D communication. Alternatively, when the received quality of the downlink signal received in the second UE 10B from the radio base station 310 becomes less than the first threshold value beyond a first period, the communication to be performed by the second UE 10B is switched to the D2D communication.

Meanwhile, when the received quality of the downlink signal received in the second UE 10B from the radio base station 310 exceeds a second threshold value, the communication to be performed by the second UE 10B is switched to the D2D communication. Alternatively, when the received quality of the downlink signal received in the second UE 10B from the radio base station 310 exceeds the second threshold value beyond a second period, the communication to be performed by the second UE 10B is switched to the D2D communication.

In addition, regardless of the type of the communication performed by the second UE 10B, it is preferable that the first UE 10A and the second UE 10B perform push-to-talk using VoIP.

(Relay of User Data)

Figure 6:
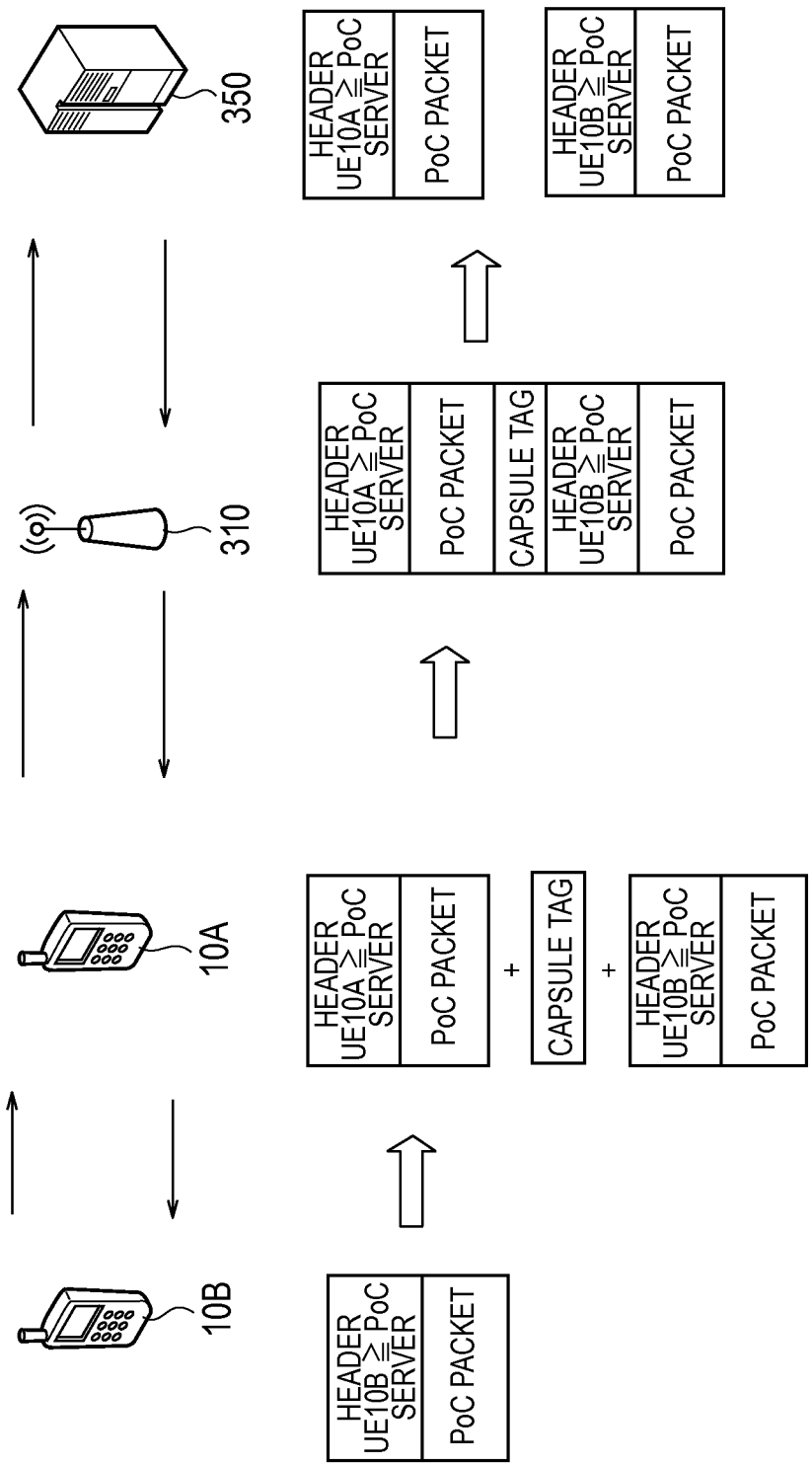
FIG. 6 is a diagram illustrating relay of data according to the first embodiment.
Figure 7:
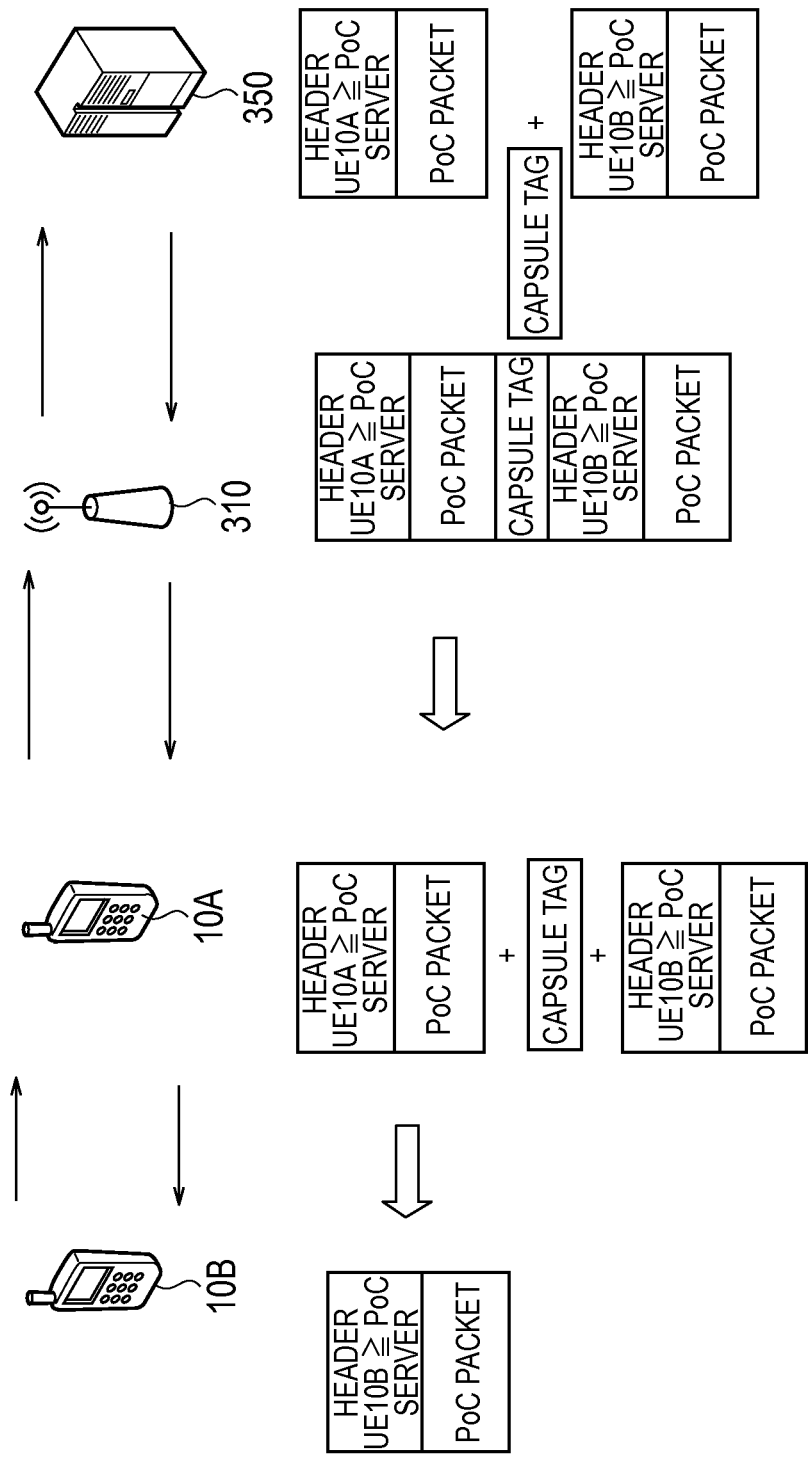
FIG. 7 is a diagram illustrating relay of data according to the first embodiment.

Hereinafter, relay of user data according to the first embodiment will be described. FIG. 6 and FIG. 7 are diagrams for explaining the relay of the user data according to the first embodiment. Furthermore, the first UE 10A performs the cellular communication and the D2D communication is performed between the first UE 10A and the second UE 10B. Furthermore, the first UE 10A and the second UE 10B perform the push-to-talk using VoIP.

As illustrated in FIG. 6, in uplink relay, the first UE 10A receives a packet (PoC Packet), which is addressed to a PoC server 350 from the second UE 10B, from the second UE 10B through the D2D communication. The first UE 10A applies a capsule tag to the packet (PoC Packet) and capsulates the packet received from the second UE 10B. The first UE 10A transmits a packet (PoC Packet), which is addressed to the PoC server 350 from the first UE 10A, to the radio base station 310 through the cellular communication. Furthermore, the first UE 10A transmits the capsulated packet to the radio base station 310 through the cellular communication.

As illustrated in FIG. 7, in downlink relay, the first UE 10A receives a packet (PoC Packet), which is addressed to the first UE 10A from the PoC server 350, from the radio base station 310 through the cellular communication. Furthermore, the first UE 10A receives a capsulated packet from the radio base station 310 through the cellular communication as a packet (PoC Packet) that is addressed to the second UE 10B from the PoC server 350. The first UE 10A removes a capsule tag from the capsulated packet and releases capsulation. The first UE 10A transmits the packet (PoC Packet), which is addressed to the second UE 10B from the PoC server 350, to the second UE 10B through the D2D communication.

(First Radio Terminal)

Figure 8:
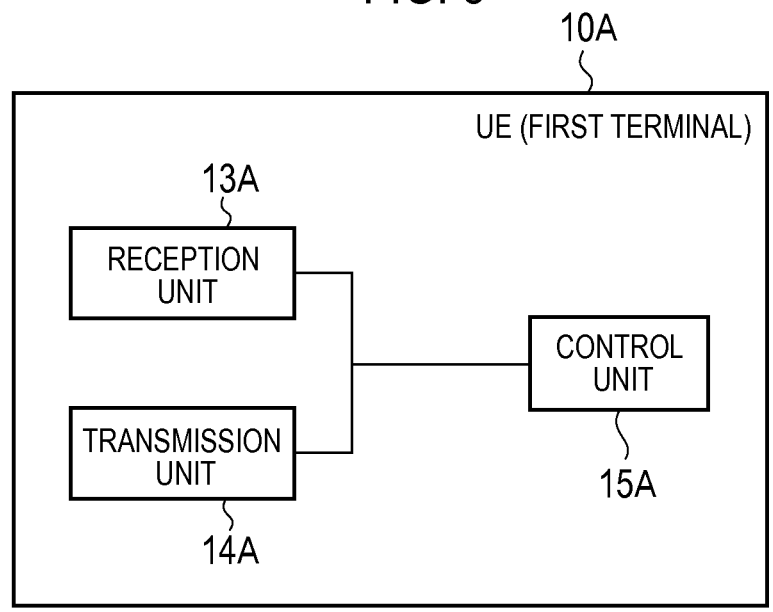
FIG. 8 is a diagram illustrating first UE 10A according to the first embodiment.

Hereinafter, the first radio terminal according to the first embodiment will be described. FIG. 8 is a block diagram illustrating the first UE 10A according to the first embodiment.

As illustrated in FIG. 8, the first UE 10A includes a reception unit 13A, a transmission unit 14A, and a control unit 15A.

The reception unit 13A receives data from the radio base station 310 in cellular communication. The reception unit 13A receives data from the second UE 10B in the D2D communication.

The transmission unit 14A transmits data to the radio base station 310 in the cellular communication. The transmission unit 14A transmits data to the second UE 10B in the D2D communication.

The control unit 15A controls the first UE 10A. Specifically, the control unit 15A has a function of performing the first communication (the cellular communication) of user data that is performed via the radio base station 310, and a function of performing the second communication (the D2D communication) of user data that is directly performed between the first UE 10A and the second UE 10B without going through the radio base station 310.

In the first embodiment, when the first UE 10A performs the cellular communication and the D2D communication is performed between the first UE 10A and the second UE 10B, the control unit 15A relays user data, which is transferred through the D2D communication, between the second UE 10B and the radio base station 310. For example, when the first UE 10A and the second UE 10B perform the push-to-talk, the control unit 15A controls the capsulation of the user data, which is transferred through the D2D communication, and the release of the capsulation.

In the first embodiment, when the second UE 10B performs the D2D communication, that is, when the second UE 10B does not perform the cellular communication, the control unit 15A may notify the second UE 10B of information for identifying the downlink signal that is transmitted from the radio base station 310.

(Second Radio Terminal)

Figure 9:
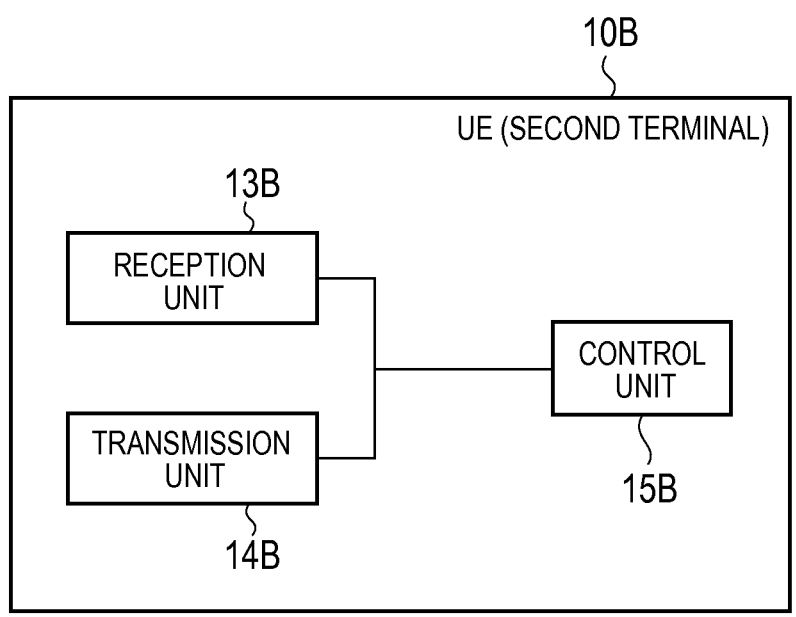
FIG. 9 is a diagram illustrating second UE 10B according to the first embodiment.

Hereinafter, the second radio terminal according to the first embodiment will be described. FIG. 9 is a block diagram illustrating the second UE 10B according to the first embodiment.

As illustrated in FIG. 9, the second UE 10B includes a reception unit 13B, a transmission unit 14B, and a control unit 15B.

The reception unit 13B receives data from the radio base station 310 in the cellular communication. The reception unit 13B receives data from the first UE 10A in the D2D communication.

The transmission unit 14B transmits data to the radio base station 310 in the cellular communication. The transmission unit 14B transmits data to the first UE 10A in the D2D communication.

The control unit 15B controls the second UE 10B. Specifically, the control unit 15B has a function of performing the first communication (the cellular communication) of user data that is performed via the radio base station 310, and a function of performing the second communication (the D2D communication) of user data that is directly performed between the first UE 10A and the second UE 10B without going through the radio base station 310.

In the first embodiment, the control unit 15B constitutes a switching control unit that switches communication to be performed by the second UE 10B, on the basis of the received quality of the downlink signal received in the second UE 10B from the radio base station 310.

Specifically, when the received quality of the downlink signal received in the second UE 10B from the radio base station 310 becomes less than the first threshold value, the control unit 15B may switch the communication to be performed by the second UE 10B to the D2D communication. Alternatively, when the received quality of the downlink signal received in the second UE 10B from the radio base station 310 becomes less than the first threshold value beyond the first period, the control unit 15B may switch the communication to be performed by the second UE 10B to the D2D communication.

Meanwhile, when the received quality of the downlink signal received in the second UE 10B from the radio base station 310 exceeds the second threshold value, the control unit 15B may switch the communication to be performed by the second UE 10B to the D2D communication. Alternatively, when the received quality of the downlink signal received in the second UE 10B from the radio base station 310 exceeds the second threshold value beyond the second period, the control unit 15B may switch the communication to be performed by the second UE 10B to the D2D communication.

(Mobile Communication Method)

Figure 10:
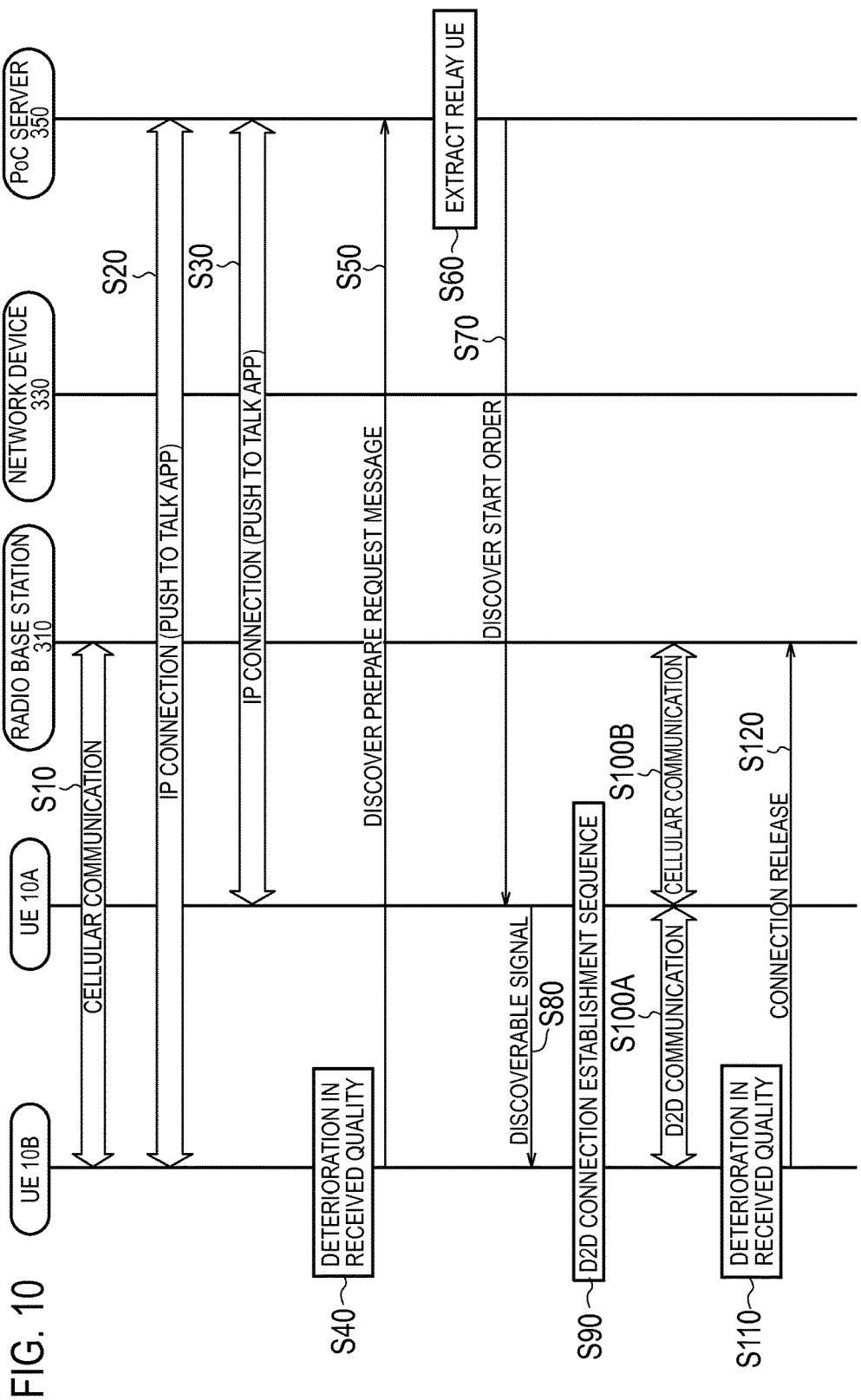
FIG. 10 is a diagram illustrating a mobile communication method according to the first embodiment.
Figure 11:
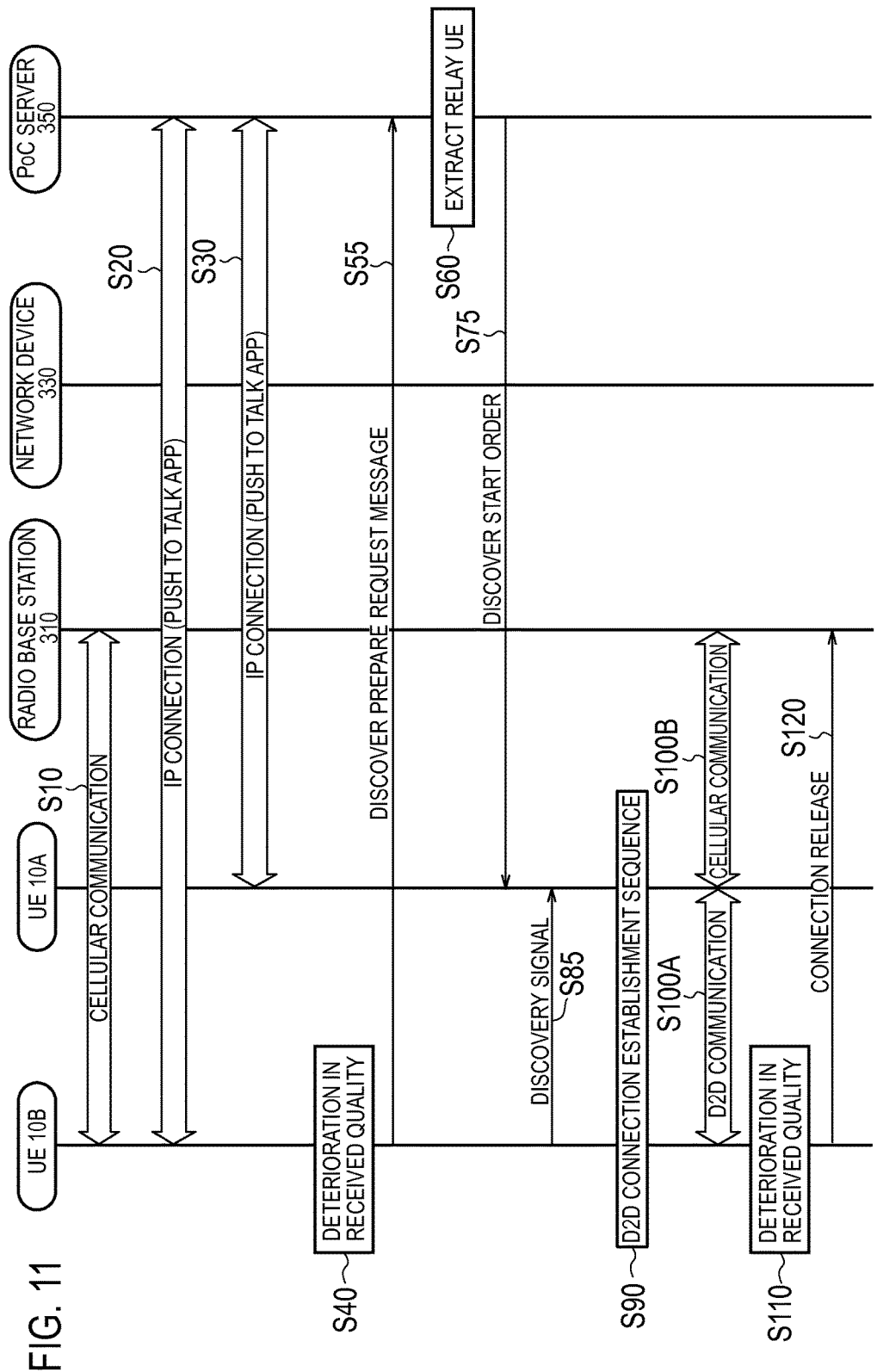
FIG. 11 is a diagram illustrating the mobile communication method according to the first embodiment.
Figure 12:
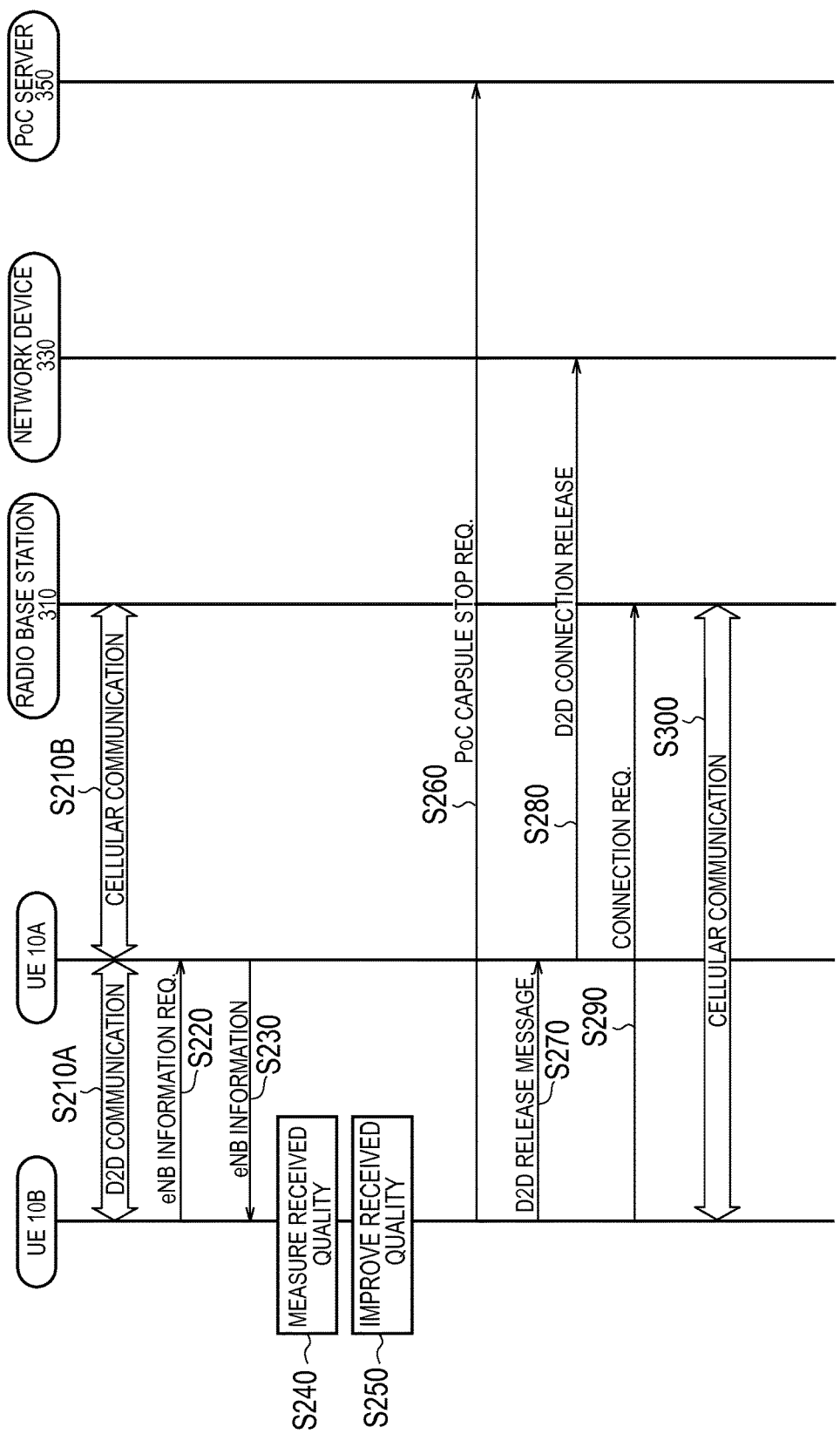
FIG. 12 is a diagram illustrating the mobile communication method according to the first embodiment.

Hereinafter, a mobile communication method according to the first embodiment will be described. FIG. 10 to FIG. 12 are diagrams illustrating the mobile communication method according to the first embodiment.

Firstly, an operation example 1, in which communication to be performed by the second UE 10B is switched to the D2D communication, will be described with reference to FIG. 10.

As illustrated in FIG. 10, in step 10, the cellular communication is performed between the second UE 10B and the radio base station 310.

In step 20, an IP connection for performing the push-to-talk between the first UE 10A and the second UE 10B is set between the second UE 10B and the PoC server 350.

In step 30, the IP connection for performing the push-to-talk between the first UE 10A and the second UE 10B is set between the first UE 10A and the PoC server 350.

In step 40, the second UE 10B detects the deterioration of the received quality of the downlink signal received from the radio base station 310. Furthermore, the received quality of the downlink signal is received quality when the second UE 10B is in a connected state.

For example, when the received quality of the downlink signal received in the second UE 10B from the radio base station 310 becomes less than the first threshold value, the second UE 10B may detect the deterioration of the received quality of the downlink signal. Alternatively, when the received quality of the downlink signal received in the second UE 10B from the radio base station 310 becomes less than the first threshold value beyond the first period, the second UE 10B may detect the deterioration of the received quality of the downlink signal.

In step 50, the second UE 10B transmits, to the PoC server 350, a message (Discover Prepare Request Message) indicating that it is possible to receive a Discoverable Signal that is transmitted from UE 10 capable of performing the D2D communication.

In step 60, the PoC server 350 extracts UE 10 that should relay data between the radio base station 310 and the second UE 10B. For example, the PoC server 350 selects UE 10 located to be nearest the second UE 10B from among UEs 10 that perform the push-to-talk with the second UE 10B. Furthermore, the PoC server 350 extracts the first UE 10A as the UE 10 that should relay the data between the radio base station 310 and the second UE 10B.

In step 70, the PoC server 350 transmits, to the first UE 10A, a message (Discover Start Order) for instructing the transmission of the Discoverable Signal.

In step 80, the first UE 10A transmits the Discoverable Signal in a broadcast manner. The second UE 10B receives the Discoverable Signal.

In step 90, a communication path for performing the D2D communication is set between the first UE 10A and the second UE 10B.

In step 100A, the D2D communication is performed between the first UE 10A and the second UE 10B. In step 100B, the cellular communication is performed between the first UE 10A and the radio base station 310.

Furthermore, the first UE 10A relays user data, which is transferred through the D2D communication, between the second UE 10B and the radio base station 310.

In step 110, the second UE 10B detects the deterioration of the received quality of the downlink signal received from the radio base station 310. Furthermore, the second UE 10B detects the deterioration of a level by which it is not possible to maintain a connection between the second UE 10B and the radio base station 310.

In step 120, the second UE 10B transmits, to the radio base station 310, a message (Connection Release) for requesting the release of the connection between the second UE 10B and the radio base station 310.

Secondly, an operation example 2, in which communication to be performed by the second UE 10B is switched to the D2D communication, will be described with reference to FIG. 11. In the operation example 1, the second UE 10B receives the Discoverable Signal. However, in the operation example 2, the second UE 10B transmits the Discovery Signal. In FIG. 11, the same reference numerals are used to designate the same processes as those of FIG. 10. Accordingly, a description of the same processes as those of FIG. 10 will be omitted.

As illustrated in FIG. 11, in step 55, the second UE 10B transmits, to the PoC server 350, a message (Discover Prepare Request Message) indicating that it is possible to transmit a Discovery Signal for searching UE 10 capable of performing the D2D communication. The process in step 55 is performed instead of the process in step 50 illustrated in FIG. 10.

In step 75, the PoC server 350 transmits, to the first UE 10A, a message (Discover Start Order) for instructing the reception of the Discovery Signal. The process in step 75 is performed instead of the process in step 70 illustrated in FIG. 10.

In step 85, the second UE 10B transmits the Discovery Signal in a broadcast manner. The first UE 10A receives the Discovery Signal. The process in step 85 is performed instead of the process in step 80 illustrated in FIG. 10.

Thirdly, an operation example, in which communication to be performed by the second UE 10B is switched to the cellular communication, will be described with reference to FIG. 12.

As illustrated in FIG. 12, in step 210A, the D2D communication is performed between the first UE 10A and the second UE 10B. In step 210B, the cellular communication is performed between the first UE 10A and the radio base station 310.

In step 220, the second UE 10B transmits, to the first UE 10A, a message (eNB Information Request) for requesting information on the radio base station 310.

In step 230, the first UE 10A transmits the information (eNB Information) on the radio base station 310 to the second UE 10B. The information on the radio base station 310 includes information for identifying the downlink signal transmitted from the radio base station 310.

In step 240, on the basis of the information on the radio base station 310, the second UE 10B measures the received quality of the downlink signal received in the second UE 10B from the radio base station 310. Furthermore, the received quality of the downlink signal is received quality when the second UE 10B is in an idle state.

In step 250, the second UE 10B detects the improvement of the received quality of the downlink signal received in the second UE 10B from the radio base station 310.

For example, when the received quality of the downlink signal received in the second UE 10B from the radio base station 310 exceeds the second threshold value, the second UE 10B may detect the improvement of the received quality of the downlink signal. Alternatively, when the received quality of the downlink signal received in the second UE 10B from the radio base station 310 exceeds the second threshold value beyond the second period, the second UE 10B may detect the improvement of the received quality of the downlink signal.

In step 260, the second UE 10B transmits, to the PoC server 350, a message (PoC Capsule Stop req.) for requesting the stop of capsulation.

In step 270, the second UE 10B transmits, to the first UE 10A, a message (D2D Release Message) for requesting the release of a communication path for performing the D2D communication.

In step 280, the first UE 10A transmits, to the network device 330, a message (D2D Connection Release) for notifying the release of the communication path for performing the D2D communication.

In step 290, the second UE 10B transmits, to the radio base station 310, a message (Connection Req.) for requesting a connection between the second UE 10B and the radio base station 310.

In step 300, the cellular communication is performed between the second UE 10B and the radio base station 310.

However, the process in the aforementioned step 260 may also be performed after step 300.

(Operation and Effect)

In the first embodiment, the first UE 10A relays user data, which is transferred through the D2D communication, between the second UE 10B and the radio base station 310. In this way, even in the state in which the second UE 10B is not able to perform the cellular communication (for example, the state in which the second UE 10B enters a tunnel), it is possible to continue the communication of the second UE 10B.

In the first embodiment, when the first UE 10A performs the cellular communication, the second UE 10B controls the switching of communication to be performed by the second UE 10B between the cellular communication and the D2D communication, on the basis of the received quality of the downlink signal received in the second UE 10B from the radio base station 310. In this way, in the state in which the second UE 10B is not able to perform the cellular communication, the second UE 10B performs the D2D communication, it is possible to continue the communication of the second UE 10B. Furthermore, in the state in which the second UE 10B is able to perform the cellular communication, the second UE 10B performs the cellular communication, it is possible to reduce the load of the first UE 10A.

As described above, according to the embodiment, it is possible to newly create a use scene in which the D2D communication is effectively used.

First Modification

Hereinafter, a first modification of the first embodiment is explained. In the first embodiment, the second UE 10B determines the deterioration of the received quality or the improvement of the received quality. That is, the switching control unit, which switches communication to be performed by the second UE 10B, is provided in the second UE 10B. On the other hand, in the first modification, the network device 330 determines the deterioration of the received quality or the improvement of the received quality. That is, the switching control unit, which switches communication to be performed by the second UE 10B, is provided in the network device 330.

In order to perform such an operation, in the first modification, the second UE 10B reports, to the network device 330, the received quality of a downlink signal received in the second UE 10B from the radio base station 310.

(Mobile Communication Method)

Figure 13:
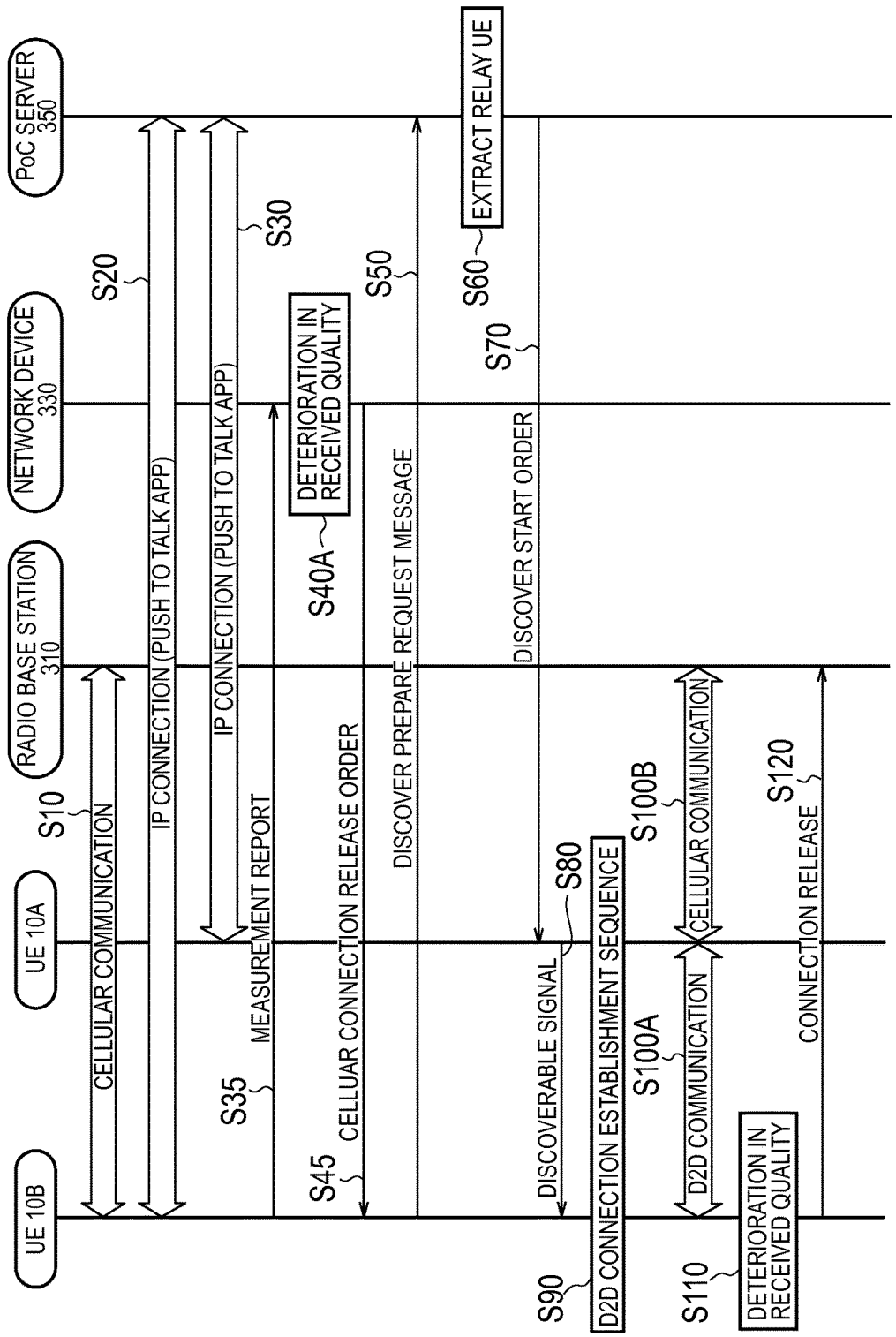
FIG. 13 is a diagram illustrating the mobile communication method according to the first modification.
Figure 14:
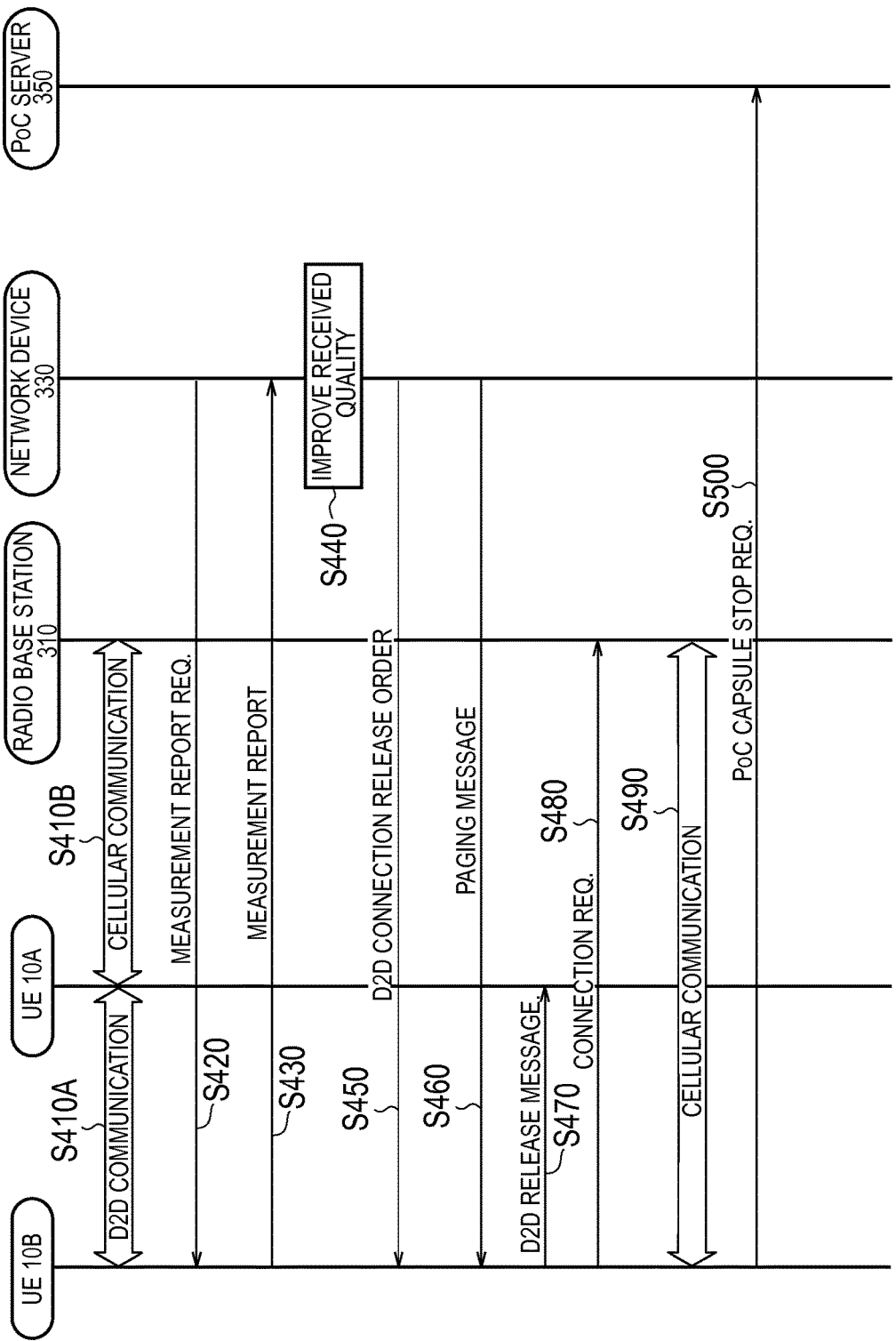
FIG. 14 is a diagram illustrating a mobile communication method according to a first modification.

Hereinafter, the mobile communication method in the first modification will be described. FIG. 13 and FIG. 14 are diagrams illustrating the mobile communication method according to the first modification.

Firstly, an operation example, in which communication to be performed by the second UE 10B is switched to the D2D communication, will be described with reference to FIG. 13. In FIG. 13, the same reference numerals are used to designate the same processes as those of FIG. 10. Accordingly, a description of the same processes as those of FIG. 10 will be omitted.

As illustrated in FIG. 13, in step 35, the second UE 10B measures the received quality of a downlink signal that is received from the radio base station 310. Furthermore, the received quality of the downlink signal is received quality when the second UE 10B is in a connected state. Then, the second UE 10B transmits, to the network device 330, a measurement result (Measurement Report) of the received quality of the downlink signal that is transmitted from the radio base station 310.

In step 40A, the network device 330 detects the deterioration of the received quality of the downlink signal that is received from the radio base station 310.

For example, when the received quality of the downlink signal received in the second UE 10B from the radio base station 310 becomes less than a first threshold value, the network device 330 may detect the deterioration of the received quality of the downlink signal. Alternatively, when the received quality of the downlink signal received in the second UE 10B from the radio base station 310 becomes less than the first threshold value beyond a first period, the network device 330 may also detect the deterioration of the received quality of the downlink signal.

In step 45, the network device 330 transmits, to the second UE 10B, a message (Cellular Connection Release Order) for requesting the release of a communication path for performing the cellular communication.

Secondly, an operation example, in which communication to be performed by the second UE 10B is switched to the cellular communication, will be described with reference to FIG. 14. However, it is of course that it is possible to perform the same sequence as that illustrated in FIG. 14 for the operation in which the communication to be performed by the second UE 10B is switched to the D2D communication.

As illustrated in FIG. 14, in step 410A, the D2D communication is performed between the first UE 10A and the second UE 10B. In step S410B, the cellular communication is performed between the first UE 10A and the radio base station 310.

In step S420, the network device 330 transmits, to the second UE 10B, a message (Measurement Report Req.) for instructing the measurement of the received quality of a downlink signal transmitted from the radio base station 310. Furthermore, the received quality of the downlink signal is received quality when the second UE 10B is in an idle state.

In step S430, the second UE 10B transmits, to the network device 330, a measurement result (Measurement Report) of the received quality of the downlink signal that is transmitted from the radio base station 310.

In step 440, the network device 330 detects the improvement of the received quality of the downlink signal that is received in the second UE 10B from the radio base station 310.

For example, when the received quality of the downlink signal received in the second UE 10B from the radio base station 310 exceeds a second threshold value, the network device 330 may detect the improvement of the received quality of the downlink signal. Alternatively, when the received quality of the downlink signal received in the second UE 10B from the radio base station 310 exceeds the second threshold value beyond a second period, the network device 330 may also detect the improvement of the received quality of the downlink signal.

In step 450, the network device 330 transmits, to the second UE 10B, a message (D2D Connection Release Order) for requesting the release of a communication path for performing the D2D communication.

In step 460, the network device 330 transmits, to the second UE 10B, a message (Paging Message) for calling the second UE 10B.

In step 470, the second UE 10B transmits, to the first UE 10A, a message (D2D Release Message) for requesting the release of the communication path for performing the D2D communication.

In step 480, the second UE 10B transmits, to the radio base station 310, a message (Connection Req.) for requesting a connection between the second UE 10B and the radio base station 310.

In step 490, the cellular communication is performed between the second UE 10B and the radio base station 310.

In step 500, the second UE 10B transmits, to the PoC server 350, a message (PoC Capsule Stop req.) for requesting the stop of capsulation.

Second Embodiment

Next, a mobile communication system according to the second embodiment will be described. It is noted that description will be provided while focusing a portion different from the above-described embodiment, and description of a similar portion will be omitted, where necessary.

(Application Case)

Hereinafter, the application case according to the second embodiment will be described. Description of a similar portion to the application case according to the above-described embodiment will be omitted.

Figure 15:
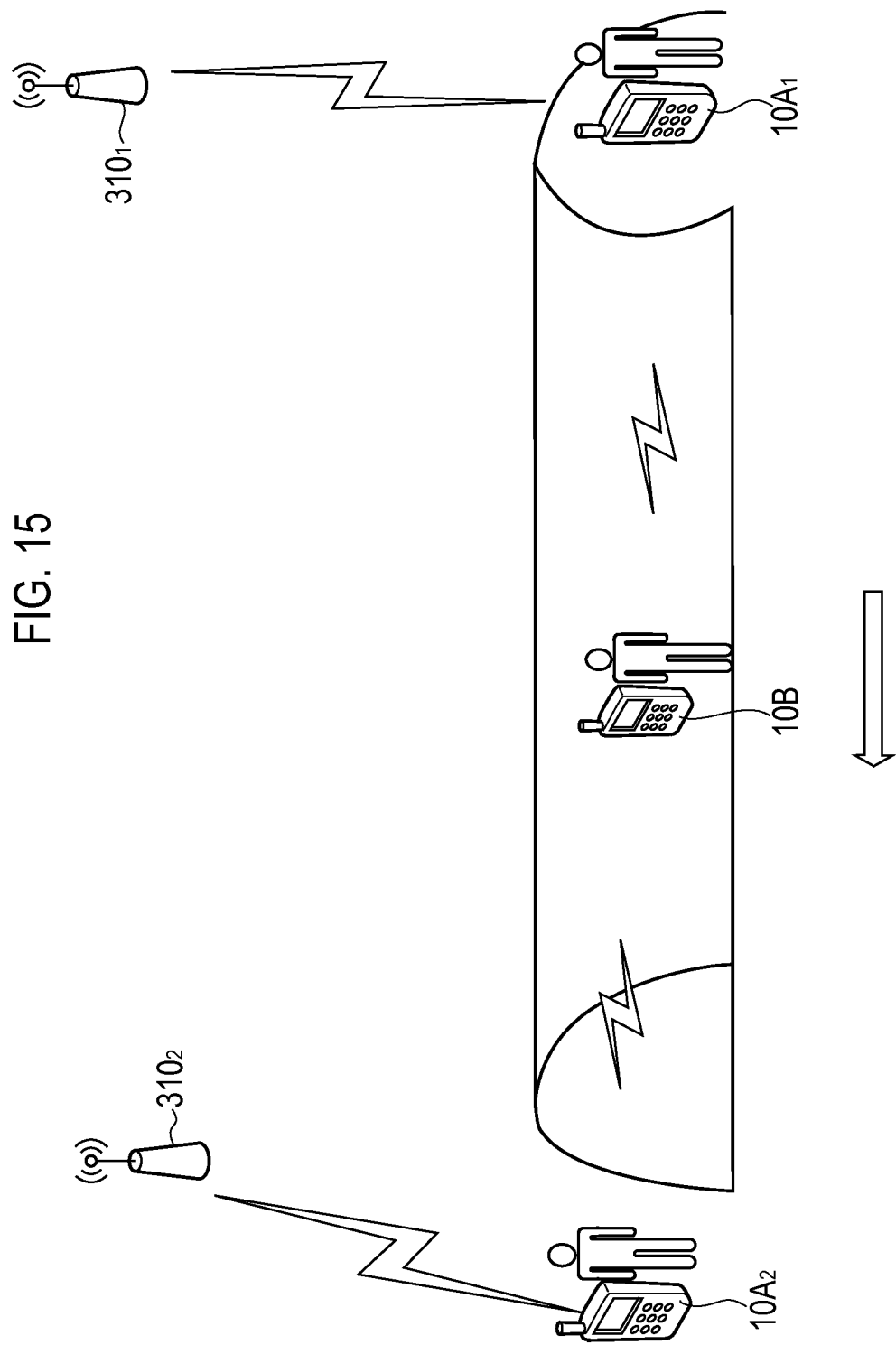
FIG. 15 is a diagram illustrating a case where the second embodiment is applied.

In the second embodiment, a description will be provided for the state in which the second radio terminal is not able to perform the first communication (the cellular communication) (for example, the state in which the second radio terminal enters a tunnel) as illustrated in FIG. 15. Furthermore, FIG. 5 illustrates a plurality of first UEs 10A (here, a first UE $10A_1$ and a first UE $10A_2$) and a second UE 10B as the plurality of UEs 10. The first UE $10A_1$ performs the first communication (the cellular communication) with a radio base station $310_1$ and the first UE $10A_2$ performs the first communication (the cellular communication) with a radio base station $310_2$. However, the first UE $10A_1$ and the first UE $10A_2$ may perform the first communication (the cellular communication) with the same radio base station 310.

Each of the plurality of first UEs 10A has a function of performing the first communication (the cellular communication) of user data that is performed via the radio base station 310, and a function of performing the second communication (the D2D communication) of user data that is directly performed between the first UE 10A and the second UE 10B without going through the radio base station 310. In the same manner, the second UE 10B has a function of performing the first communication (the cellular communication) of user data that is performed via the radio base station 310, and a function of performing the second communication (the D2D communication) of user data that is directly performed between the first UE 10A and the second UE 10B without going through the radio base station 310.

The second embodiment considers the case in which when the second UE 10B performs the D2D communication with the first UE $10A_1$, the communication quality of the D2D communication between the first UE $10A_1$ and the second UE 10B changes. For example, the case, in which the second UE 10B moves in the tunnel, so that the communication quality of the D2D communication between the first UE $10A_1$ and the second UE 10B deteriorates, is considered. In such a case, the second UE 10B switches a first UE 10A, with which the D2D communication should be performed, from the first UE $10A_1$ to the first UE $10A_2$.

Specifically, on the basis of the received quality of a signal received in the second UE 10B from each of the plurality of the first UEs 10A, the first UE 10A, with which the second UE 10B should perform the second communication (D2D communication), is selected from among the plurality of the first UEs 10A.

(Second Radio Terminal)

Hereinafter, the second radio terminal according to the second embodiment will be described.

In the second embodiment, the control unit 15B included in the second UE 10B constitutes a selection unit that selects a first UE 10A, with which the second UE 10B should perform the second communication (the D2D communication), from among the plurality of first UEs 10A on the basis of the received quality of a signal received in the second UE 10B from each of the plurality of first UEs 10A. For example, the control unit 15B selects a first UE 10A having the highest received quality from among the plurality of first UEs 10A as the first UE 10A with which the D2D communication should be performed. Alternatively, the control unit 15B may select a first UE 10A, which has received quality higher than predetermined quality with respect to the received quality of a signal received from a first UE 10A which is currently performing the D2D communication, as the first UE 10A with which the D2D communication should be performed. In other words, if there is no first UE 10A, which has the received quality higher than the predetermined quality with respect to the received quality of the signal received from the first UE 10A which is currently performing the D2D communication, the control unit 15B may select the first UE 10A, which is currently performing the D2D communication, as the first UE 10A with which the D2D communication should be performed.

The signal received in the second UE 10B from each of the plurality of first UEs 10A, for example, is a Discoverable Signal indicating that it is possible to perform the D2D communication. Furthermore, the received quality of the signal received from each first UE 10A, for example, may be the received power of the signal received from each first UE 10A, or SIR (Signal-to-Interference Ratio) of the signal received from each first UE 10A.

(Mobile Communication Method)

Figure 16:
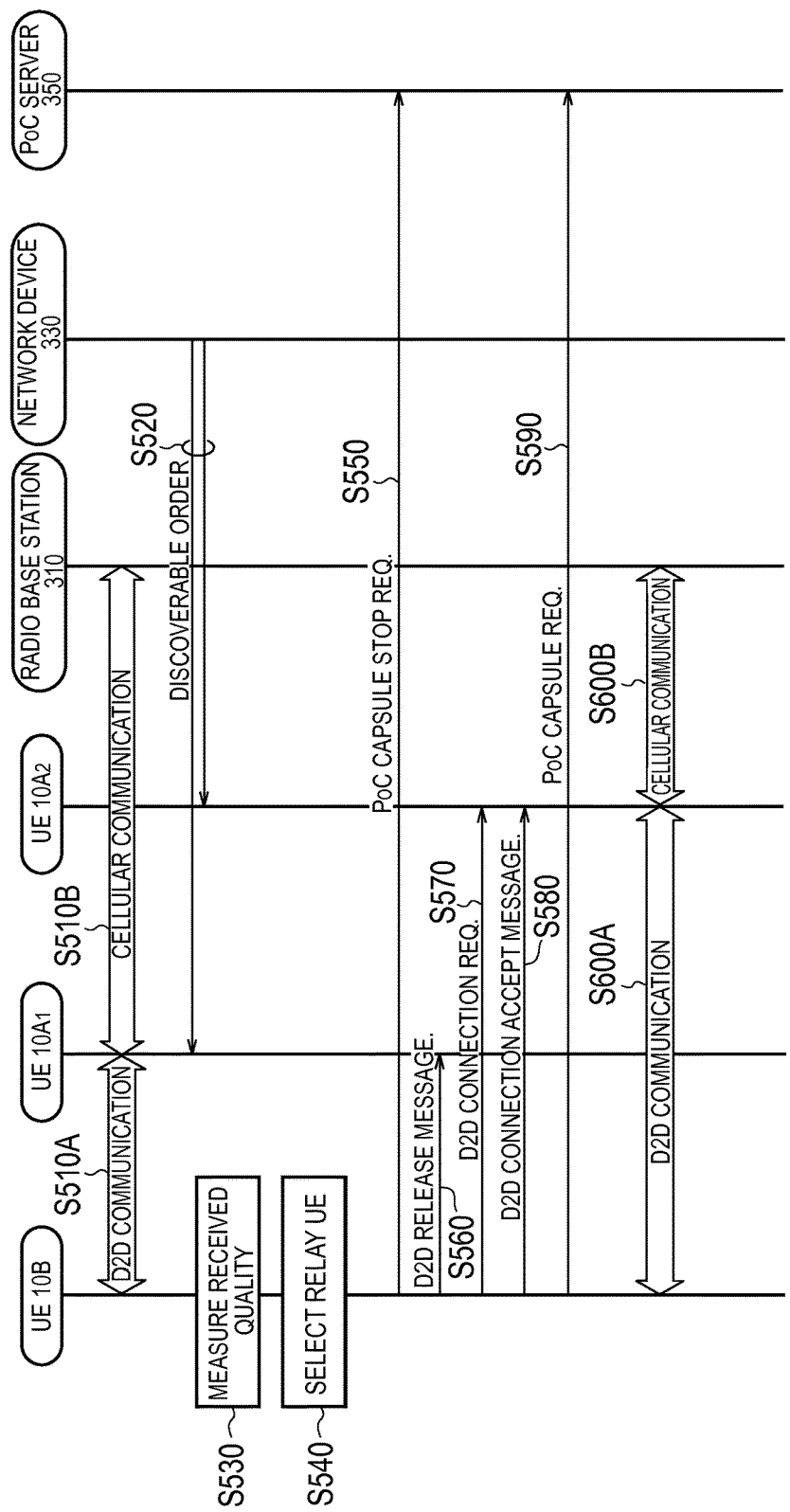
FIG. 16 is a diagram illustrating the mobile communication method according to the second embodiment.

Hereinafter, a mobile communication method according to the second embodiment will be described. FIG. 16 is diagrams illustrating the mobile communication method according to the second embodiment.

Specifically, an operation example, in which the second UE 10B selects a first UE 10A with which the D2D communication is to be performed, will be described with reference to FIG. 16. Furthermore, the first UE 10A$_1$ and the first UE 10A$_2$ are provided as the first UE 10A.

As illustrated in FIG. 16, in step 510A, the D2D communication is performed between the first UE 10A$_1$ and the second UE 10B. In step 510B, the cellular communication is performed between the first UE 10A and the radio base station 310.

In step 520, the network device 330 transmits, to the first UE 10A$_1$ and the first UE 10A$_2$, a message (Discoverable Order) for instructing the transmission of a Discoverable Signal indicating that it is possible to perform the D2D communication. The first UE 10A$_1$ and the first UE 10A$_2$ transmit the Discoverable Signal in response to the reception of the message (Discoverable Order).

In step 530, the second UE 10B measures the received quality of the Discoverable Signals that are transmitted from the first UE 10A$_1$ and the first UE 10A$_2$.

In step 540, the second UE 10B selects a first UE 10A, with which the second UE 10B should perform the second communication (the D2D communication), from among the plurality of first UEs 10A. In other words, the second UE 10B selects UE 10A that should relay data between the radio base station 310 and the second UE 10B.

As described above, the second UE 10B selects a first UE 10A having the highest received quality from among the plurality of first UEs 10A as the first UE 10A with which the D2D communication should be performed. Alternatively, the second UE 10B may select a first UE 10A, which has received quality higher than predetermined quality with respect to the received quality of a signal received from a first UE 10A which is currently performing the D2D communication, as the first UE 10A with which the D2D communication should be performed. In other words, if there is no first UE 10A, which has the received quality higher than the predetermined quality with respect to the received quality of the signal received from the first UE 10A which is currently performing the D2D communication, the second UE 10B may select the first UE 10A, which is currently performing the D2D communication, as the first UE 10A with which the D2D communication should be performed.

Furthermore, the following description will be given on the assumption that the first UE 10A$_2$ is selected as the first UE 10A with which the D2D communication should be performed.

In step 550, the second UE 10B transmits, to the PoC server 350, a message (PoC Capsule Stop req.) for requesting the stop of capsulation that is performed by the first UE 10A$_1$.

In step 560, the second UE 10B transmits, to the first UE 10A$_1$, a message (D2D Release Message) for requesting the release of a communication path for performing the D2D communication.

In step 570, the second UE 10B transmits, to the first UE 10A$_2$, a message (D2D Connection Req.) for requesting the setting of a communication path for performing the D2D communication.

In step 580, the second UE 10B transmits, to the first UE 10A$_2$, a message (D2D Connection Accept Message) indicating that the communication path for performing the D2D communication is set.

In step 590, the second UE 10B transmits, to the PoC server 350, a message (PoC Capsule req.) for requesting the start of capsulation that is performed by the first UE 10A$_2$.

In step 600A, the D2D communication is performed between the first UE 10A$_2$ and the second UE 10B. In step 600B, the cellular communication is performed between the first UE 10A$_2$ and the radio base station 310.

(Operation and Effect)

In the second embodiment, the second UE 10B selects a first UE 10A, with which the second UE 10B should perform the second communication, from among the plurality of first UEs 10A on the basis of the received quality of a signal received in the second UE 10B from each of the plurality of first UEs 10A. In this way, it is possible to appropriately select a first UE 10A that should relay user data that is transferred through the second communication (the D2D communication).

First Modification

Hereinafter, a first modification of the second embodiment is explained. In the second embodiment, the second UE 10B selects a first UE 10A with which the D2D communication should be performed. That is, the selection unit, which selects the first UE 10A with which the D2D communication should be performed, is provided in the second UE 10B. On the other hand, in the first modification, the network device 330 selects the first UE 10A with which the D2D communication should be performed. That is, the selection unit, which selects the first UE 10A with which the D2D communication should be performed, is provided in the network device 330.

In order to perform such an operation, in the first modification, the second UE 10B reports, to the network device 330, the received quality of signals received in the second UE 10B from the plurality of first UEs 10A.

Figure 17:
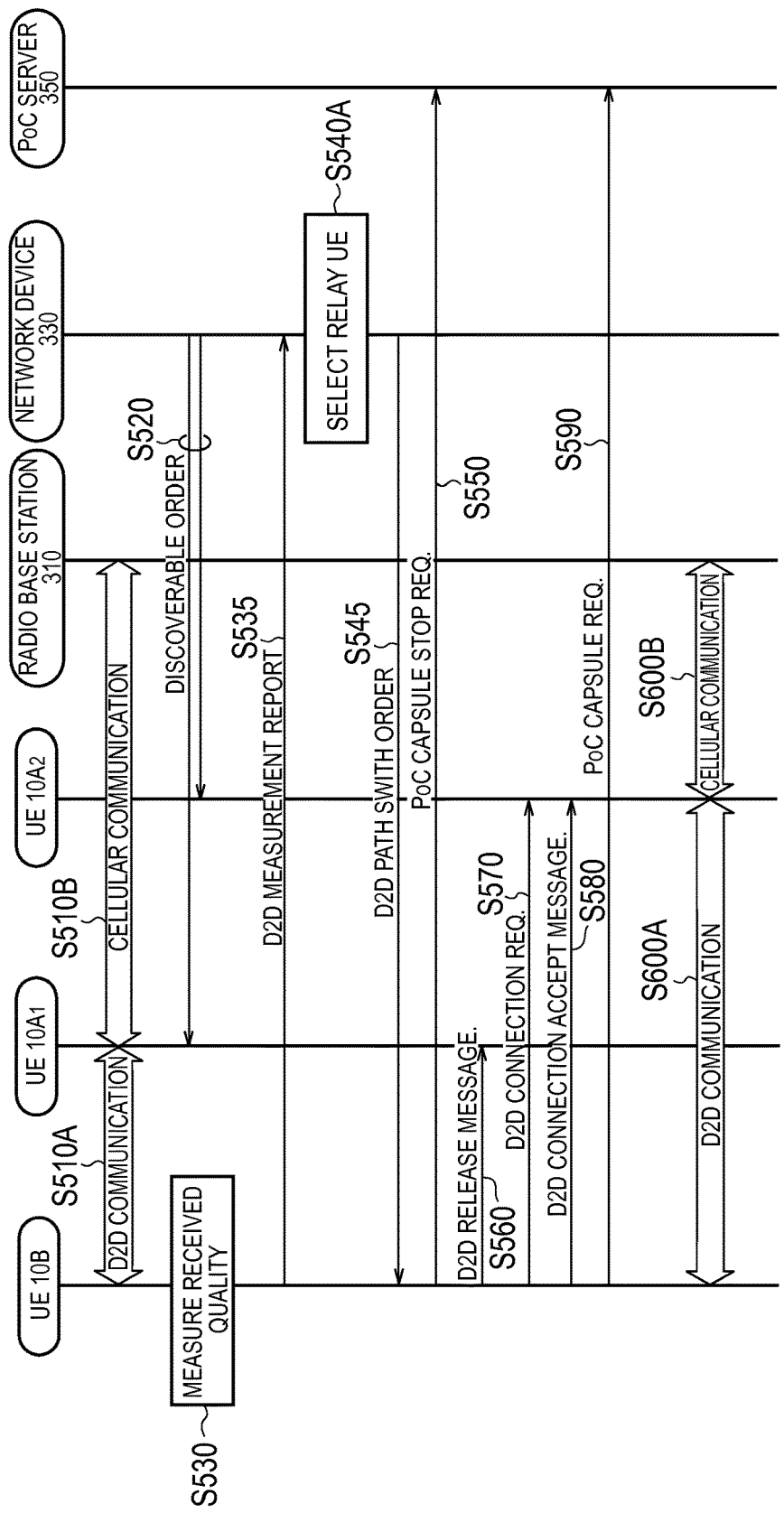
FIG. 17 is a diagram illustrating a mobile communication method according to a first modification according to the second embodiment.

Hereinafter, an operation example, in which the second UE 10B selects the first UE 10A with which the D2D communication is to be performed, will be described with reference to FIG. 17. In FIG. 17, the same reference numerals are used to designate the same processes as those of FIG. 16. Accordingly, a description of the same processes as those of FIG. 16 will be omitted.

As illustrated in FIG. 17, in step 535, the second UE 10B transmits, to the network device 330, a message (D2D Measurement Report) indicting the received quality of Discoverable Signals that are transmitted from the first UE 10A$_1$ and the first UE 10A$_2$.

In step 540A, the network device 330 selects a first UE 10A, with which the second UE 10B should perform the second communication (the D2D communication), from among the plurality of first UEs 10A. In other words, the network device 330 selects UE 10A that should relay data between the radio base station 310 and the second UE 10B. A selection reference of the first UE 10A, with which the D2D communication should be performed, is the same as that of the second embodiment.

Furthermore, the following description will be given on the assumption that the first UE 10A$_2$ is selected as the first UE 10A with which the D2D communication should be performed.

In step 545, the network device 330 transmits, to the second UE 10B, a message (D2D Path Switch order) for instructing the switching of the first UE 10A, with which the D2D communication should be performed, from the first UE 10A$_1$ to the first UE 10A$_2$.

Third Embodiment

Next, a mobile communication system according to the third embodiment will be described. It is noted that description will be provided while focusing a portion different from the above-described embodiments, and description of a similar portion will be omitted, where necessary.

(Application Case)

Hereinafter, the application case according to the second embodiment will be described. Description of a similar portion to the application cases according to the above-described embodiments will be omitted.

Figure 18:
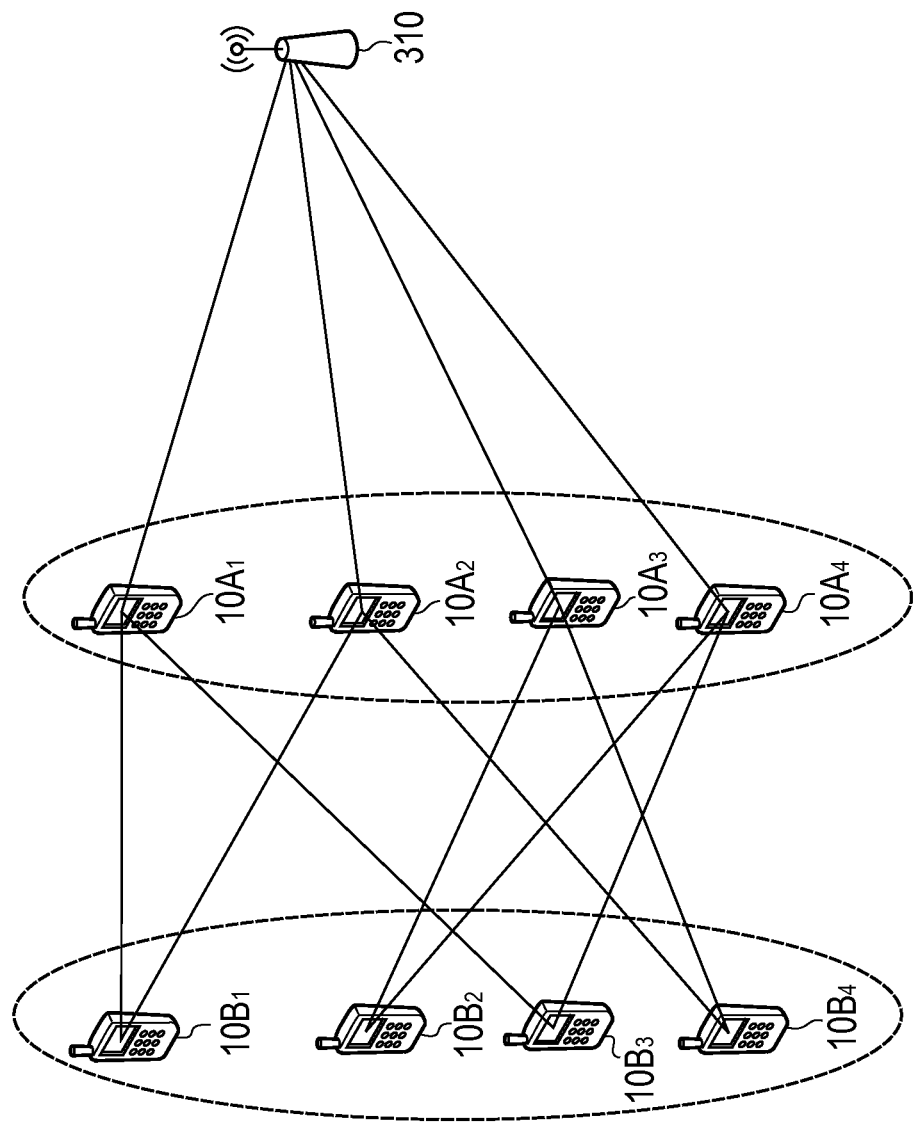
FIG. 18 is a diagram illustrating a case where the third embodiment is applied.

In the third embodiment, a description will be provided for the state in which the second radio terminal is not able to perform the first communication (the cellular communication) (for example, the state in which the second radio terminal enters a tunnel) as illustrated in FIG. 18. Furthermore, as a plurality of UEs 10, a plurality of first UEs 10A (here, a first UE $10A_1$ to a first UE $10A_4$) and a plurality of second UEs 10B (here, a first UE $10B_1$ to a first UE $10B_4$) are illustrated. The first UE $10A_1$ performs the first communication (the cellular communication) with a radio base station $310_1$, and the first UE $10A_2$ performs the first communication (the cellular communication) with a radio base station $310_2$. However, the first UE $10A_1$ and the first UE $10A_2$ may perform the first communication (the cellular communication) with the same radio base station 310.

Each of the plurality of first UEs 10A has a function of performing the first communication (the cellular communication) of user data that is performed via the radio base station 310, and a function of performing the second communication (the D2D communication) of user data that is directly performed between the first UE 10A and the second UE 10B without going through the radio base station 310. In the same manner, each of the plurality of second UEs 10B has a function of performing the first communication (the cellular communication) of user data that is performed via the radio base station 310, and a function of performing the second communication (the D2D communication) of user data that is directly performed between the first UE 10A and the second UE 10B without going through the radio base station 310.

In the third embodiment, a communication path for performing the second communication (the D2D communication) has been set between each of the plurality of first UEs 10A and the second UE 10B. For example, as illustrated in FIG. 18, a communication path for performing the D2D communication has been set between each of the first UE $10A_1$ to the first UE $10A_4$ and the first UE $10B_1$.

In such a case, when the communication path for performing the second communication (the D2D communication) has been set between each of the plurality of first UEs 10A and the second UE 10B, the second UE 10B time-divisionally switches the first UE 10A that is to perform the D2D communication.

Furthermore, when the number of times, by which the first UE 10A is selected to perform the second communication (the D2D communication), reaches a predetermined number of times, the second UE 10B preferably releases the communication path that is set for the first UE 10A having the number of selecting times that reaches the predetermined number of times. Alternatively, when a passage time after the setting of the communication path for performing the second communication (the D2D communication) reaches a predetermined time, the second UE 10B preferably releases the communication path that is set for the first UE 10A having the passage time that reaches the predetermined time.

(Second Radio Terminal)

Hereinafter, the second radio terminal according to the third embodiment will be described.

In the third embodiment, when a communication path for performing the second communication (the D2D communication) has been set between each of the plurality of first UEs 10A and the second UE 10B, the control unit 15B included in the second UE 10B time-divisionally switches the first UE 10A that is to perform the D2D communication.

Specifically, the control unit 15B may select the first UE 10A, which is to perform the D2D communication, according to an order in which the communication path is set. Alternatively, the control unit 15B may randomly select the first UE 10A that is to perform the D2D communication.

However, the control unit 15B preferably selects the first UE 10A with which is to perform the D2D communication, from among the plurality of first UEs 10A, such that the number of times by which the first UE 10A is selected as a UE with which is to perform the D2D communication is averaged. Alternatively, the control unit 15B preferably selects the first UE 10A, which is to perform the D2D communication, from among the plurality of first UEs 10A such that times, for which data is relayed through the D2D communication, are averaged. Alternatively, the control unit 15B preferably selects the first UE 10A, which is to perform the D2D communication, from among the plurality of first UEs 10A such that the amount of data, which is relayed through the D2D communication, is averaged.

Furthermore, when the number of times, by which the first UE 10A is selected to perform the second communication (the D2D communication), reaches a predetermined number of times, the control unit 15B preferably releases the communication path that is set for the first UE 10A having the number of selecting times that reaches the predetermined number of times. Alternatively, when a passage time after the setting of the communication path for performing the second communication (the D2D communication) reaches a predetermined time, the control unit 15B preferably releases the communication path that is set for the first UE 10A having the passage time that reaches the predetermined time.

(Mobile Communication Method)

Hereinafter, a mobile communication method according to the third embodiment will be described. FIG. 19 is diagrams illustrating the mobile communication method according to the third embodiment.

Specifically, with reference to FIG. 19, a description will be provided for an operation example of time-divisionally switching the first UE 10A that is to perform the D2D communication. Furthermore, a first UE $10A_1$ and a first UE $10A_2$ are provided as the first UE 10A.

As illustrated in FIG. 19, in step 710, the second UE 10B transmits, to the first UE $10A_1$, a message (D2D Connection Req.) for requesting the setting of a communication path for performing the D2D communication.

In step 720, the first UE $10A_1$ transmits, to the second UE 10B, a message (D2D Connection Res.) for permitting the setting of the communication path for performing the D2D communication.

In step 730, a session (D2D Relay Session 1) for relaying data via the first UE $10A_1$ is set between the second UE 10B and the network device 330.

In step 740, a bearer (IP connection Via Session 1) for relaying data via the first UE $10A_1$ is set between the second UE 10B and the PoC server 350.

In step 750, the second UE 10B transmits, to the first UE $10A_2$, a message (D2D Connection Req.) for requesting the setting of a communication path for performing the D2D communication.

In step 760, the first UE 10A₂ transmits, to the second UE 10B, a message (D2D Connection Res.) for permitting the setting of the communication path for performing the D2D communication.

In step 770, a session (D2D Relay Session 2) for relaying data via the first UE 10A₂ is set between the second UE 10B and the network device 330.

In step 780, a bearer (IP connection Via Session 2) for relaying data via the first UE 10A₂ is set between the second UE 10B and the PoC server 350.

In the following processes, between the first UE 10A₁ and the first UE 10A₂, the first UE 10A, which is to perform the D2D communication, is time-divisionally switched. In other words, between the "IP connection Via Session 1" and the "IP connection Via Session 2", the bearer for relaying data between the second UE 10B and the PoC server 350 is time-divisionally switched.

In addition, when the number of times, by which the first UE 10A is selected to perform the second communication (the D2D communication), reaches a predetermined number of times (n times), it is preferable to releases the communication path that is set for the first UE 10A having the number of selecting times that reaches the predetermined number of times.

For example, when the number of selecting times of the first UE 10A₁ reaches a predetermined number of times, the second UE 10B transmits, to the first UE 10A₁, a message (D2D Release Message) for requesting the release of the communication path for performing the D2D communication in step 790.

(Operation and Effect)

In the third embodiment, when a communication path for performing the second communication has been set between each of the plurality of first UEs 10A and the second UE 10B, the second UE 10B, the second control unit time-divisionally switches the first UE 10A that is to perform the second communication. In this way, it is possible to distribute loads of the first UEs 10A without concentrating a load on one first UE 10A.

First Modification

Hereinafter, a first modification of the third embodiment is explained. Although not particularly mentioned in the third embodiment, an upper limit of the number of first UEs 10A, which is to perform the second communication (the D2D communication), is determined in advance in the first modification.

Specifically, when the number of first UEs 10A, which relay user data between the second UE 10B and the radio base station 310, reaches a predetermined number, the second UE 10B ends an operation for setting a communication path for performing the D2D communication with a new first UE 10A, wherein the user data is transferred through the D2D communication. The second UE 10B time-divisionally switches the first UEs 10A, which is to perform the D2D communication, from among the predetermined number of first UEs 10A.

Second Modification

A description will be given below of a second modification of the third embodiment. Although not particularly mentioned in the third embodiment, a time interval, in which an operation for setting a communication path for performing the D2D communication with the new first UE 10A is permitted, is determined in advance in the second modification.

Specifically, when a fixed period has passed after a communication path for performing the D2D communication is initially set, the second UE 10B ends an operation for setting a communication path for performing the D2D communication with the new first UE 10A. The second UE 10B time-divisionally switches the first UE 10A, which is to perform the D2D communication, from among a plurality of first UEs 10A for which a communication path for performing the D2D communication has been set in a fixed period.

Other Embodiments

The present invention is explained through the above embodiment, but it must not be understood that this invention is limited by the statements and the drawings constituting a part of this disclosure. From this disclosure, various alternative embodiments, examples, and operational technologies will become apparent to those skilled in the art.

The embodiments have described the case in which the two UEs 10 communicate with each other in the D2D communication. However, the embodiments are not limited thereto. Specifically, in the D2D communication, three or more UEs 10 may communicate with one another.

The embodiments have mainly described the case in which a radio resource used in the D2D communication is an uplink radio resource. However, the embodiments are not limited thereto. For example, the radio resource used in the D2D communication may be a downlink radio resource.

The embodiments have described the case in which the first UE 10A and the second UE 10B perform the push-to-talk. However, the embodiments are not limited thereto. It is not essential that the first UE 10A and the second UE 10B perform the push-to-talk.

In the embodiments, in an environment in which the second UE 10B is not able to perform the first communication (cellular communication), the first UE 10A relays user data, which is transferred through the D2D communication, between the second UE 10B and the radio base station 310. However, the embodiments are not limited thereto. That is, in an environment in which the second UE 10B is able to perform the first communication (cellular communication), the first UE 10A may relay user data, which is transferred through the D2D communication, between the second UE 10B and the radio base station 310.

Although not particularly mentioned in the aforementioned embodiments, it is possible to provide a program for causing a computer to perform each process that is performed by the UE 10 (the first UE 10A or the second UE 10B). Furthermore, the program may be recorded on a computer-readable medium. By using the computer-readable medium, it is possible to install the program in a computer. Furthermore, the computer-readable medium recording the program thereon may include a non-transitory recording medium. The non-transitory recording medium is not particularly limited. For example, the non-transitory recording medium may include a recording medium such as CD-ROM or DVD-ROM.

Alternatively, it is possible to provide a chip including a memory, which stores the program for performing each process that is performed by the UE 10 (the first UE 10A or the second UE 10B), and a processor for executing the programs stored in the memory.

Further, in the aforementioned embodiments, one example of the present invention is applied to the LTE system is described; however, the present invention is not limited to the LTE system, and the present invention may be applied to a system other than the LTE system.

In addition, the entire contents of U.S. Provisional Application No. 61/706,251 (filed on Sep. 27, 2012), U.S. Provisional Application No. 61/706,262 (filed on Sep. 27, 2012) and U.S. Provisional Application No. 61/706,289 (filed on Sep. 27, 2012) are incorporated in the present specification by reference.

INDUSTRIAL APPLICABILITY

As described above, the mobile communication system according to the present invention are able to effectively use D2D communication in various use scenes, and thus is useful for a mobile communication field.

The invention claimed is:

1. A mobile communication method, comprising:
performing, by a first radio terminal, a relay between a second radio terminal and a radio base station by direct device to device (D2D) communication;
transmitting, from the second radio terminal to the first radio terminal, a first message for requesting a release of a connection of the D2D communication between the first radio terminal and the second radio terminal; and
transmitting, from the first radio terminal to a network apparatus being a Mobility Management Entity (MME), a second message for notifying that the connection between the first radio terminal and the second user terminal has been released, after the first radio terminal receives the first message.

2. The mobile communication method according to claim 1, further comprising:
measuring, by the second radio terminal, received power of a downlink signal from the radio base station; and
transmitting, from the second radio terminal to the first radio terminal, the first message in response to the measured received power exceeding a threshold value.

3. A first radio terminal, comprising:
a processor; and
a memory communicatively coupled to the processor, wherein
the processor is configured to:
perform a relay between a second radio terminal and a radio base station by direct device to device (D2D) communication between the first radio terminal and the second radio terminal;
receive, from the second radio terminal, a first message for requesting a release of a connection of the D2D communication; and
transmit, to a network apparatus being a Mobility Management Entity (MME), a second message for notifying that the connection between the first radio terminal and the second user terminal has been released, after receiving the first message.

4. A processor for controlling a first radio terminal, the processor coupled to a memory and configured to:
perform a relay between a second radio terminal and a radio base station by direct device to device (D2D) communication between the first radio terminal and the second radio terminal;
receive, from the second radio terminal, a first message for requesting a release of a connection of the D2D communication; and
transmit, to a network apparatus being a Mobility Management Entity (MME), a second message for notifying that the connection between the first radio terminal and the second user terminal has been released, after receiving the first message.

5. The mobile communication method according to claim 1, further comprising:
releasing, by the second user terminal, the connection between the first radio terminal and the second radio terminal in response to a reception of the first message from the first radio terminal, wherein
in transmitting the second message, the second user terminal transmits the second message in response to the release of the connection between the first radio terminal and the second radio terminal.

* * * * *